United States Patent
Hannuksela et al.

(10) Patent No.: US 9,918,080 B2
(45) Date of Patent: Mar. 13, 2018

(54) REFERENCE PICTURE HANDLING

(71) Applicant: Nokia Technologies Oy, Espoo (FI)

(72) Inventors: Miska Matias Hannuksela, Tampere (FI); Srikanth Manchenahally Gopalakrishna, Tampere (FI)

(73) Assignee: Nokia Technologies Oy, Espoo (FI)

( * ) Notice: Subject to any disclaimer, the term of this patent is extended or adjusted under 35 U.S.C. 154(b) by 194 days.

(21) Appl. No.: 13/671,410

(22) Filed: Nov. 7, 2012

(65) Prior Publication Data

US 2013/0114742 A1    May 9, 2013

Related U.S. Application Data

(60) Provisional application No. 61/557,386, filed on Nov. 8, 2011.

(51) Int. Cl.
| | |
|---|---|
| *H04N 7/26* | (2006.01) |
| *H04N 7/30* | (2006.01) |
| *H04N 19/44* | (2014.01) |
| *H04N 19/463* | (2014.01) |
| *H04N 19/58* | (2014.01) |
| *H04N 19/52* | (2014.01) |

(52) U.S. Cl.
CPC ..... *H04N 19/00533* (2013.01); *H04N 19/463* (2014.11); *H04N 19/58* (2014.11); *H04N 19/52* (2014.11)

(58) Field of Classification Search
CPC ............. H04N 19/00533; H04N 19/58; H04N 19/463; H04N 19/52
USPC .................................................. 375/240.25
See application file for complete search history.

(56) References Cited

U.S. PATENT DOCUMENTS

| | | | |
|---|---|---|---|
| 8,948,261 B2* | 2/2015 | Sugio et al. | 375/240.14 |
| 2005/0207490 A1* | 9/2005 | Wang | H04N 19/573 |
| | | | 375/240.15 |
| 2010/0189173 A1 | 7/2010 | Chen et al. | |
| 2010/0189182 A1 | 7/2010 | Hannuksela | |
| 2011/0026593 A1* | 2/2011 | New et al. | 375/240.12 |

(Continued)

FOREIGN PATENT DOCUMENTS

| | | |
|---|---|---|
| CN | 102160381 A | 8/2011 |
| CN | 102160382 A | 8/2011 |
| WO | 2008047303 A2 | 4/2008 |

OTHER PUBLICATIONS

International Search Report and Written Opinion received for corresponding Patent Cooperation Treaty Application No. PCT/FI2012/051090, dated Feb. 2013, 14 pages.

(Continued)

*Primary Examiner* — Tung Vo
*Assistant Examiner* — Zaihan Jiang
(74) *Attorney, Agent, or Firm* — Alston & Bird LLP

(57) ABSTRACT

A reference picture marking process and a reference picture list management process is handled in a unified reference picture marking and reference picture list management process. A new idle reference picture list may be used for handling reference pictures that are not used for reference in the current picture. Differential coding of picture order count may be used to increase coding efficiency. The reference picture management syntax structure may be sent in the picture parameter set for improved coding efficiency e.g. in regular GOP (group of pictures) arrangements.

20 Claims, 7 Drawing Sheets

(56) References Cited

U.S. PATENT DOCUMENTS

| | | | |
|---|---|---|---|
| 2011/0096835 A1* | 4/2011 | Lim et al. | 375/240.12 |
| 2012/0079329 A1* | 3/2012 | Steinbach et al. | 714/704 |
| 2012/0170654 A1* | 7/2012 | Zhang et al. | 375/240.16 |
| 2012/0189055 A1* | 7/2012 | Chien et al. | 375/240.14 |
| 2012/0189062 A1* | 7/2012 | Sugio | H04N 19/176 375/240.16 |
| 2012/0320969 A1* | 12/2012 | Zheng et al. | 375/240.02 |
| 2013/0107964 A1* | 5/2013 | Wahadaniah et al. | 375/240.16 |
| 2013/0294520 A1* | 11/2013 | Lim | H04N 19/46 375/240.16 |

OTHER PUBLICATIONS

Recommendation ITU-T H.264: "Advanced Video coding for Generic Audiovisual Services", Mar. 2010, Retrieved on Feb. 18, 2013. http://www.itu.int/rec/T-REC-H.264-201003-S/en>. Sections 8.2.4.2, 8.2.4.3, 8.2.5.

Office Action for Chinese Patent Application No. 201280065869.3 dated Oct. 8, 2016, with English language summary, 10 pages.

Extended European Search Report from corresponding Application No. 12847061.4, dated Jun. 22, 2015.

Hannuksela M M et al.; "AHG21: On reference picture list construction and reference picture marking"; 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/; No. JCTVC-G643; (Nov. 8, 2011), XP030110627.

Sjoberg, R et al.; "Absolute Signaling of Reference Pictures" 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/, No. JCTVC-F493, Jul. 1, 2011 (Jul. 1, 2011); XP030009516.

Sjoberg, R et al.; "Attachment to JCTVC-F493 (Absolute Signalling of Reference Pictures): Proposed changes to HEVC Working Draft"; Jul. 19, 2011 (Jul. 19, 2011), pp. 1023; Retrieved from the Internet: URL: http://phenix.int-evry.fr/jct/ [retrieved on Jan. 16, 2015]; XP055162850.

Office Action from corresponding Chinese Patent Application No. 2012800658693, dated Dec. 11, 2017, 9 pages.

\* cited by examiner

REFERENCE PICTURE HANDLING

BACKGROUND

In many video coding systems, pictures that have been decoded earlier can be used for prediction of the image data of later pictures so that only the difference needs to be encoded. As known in the art, this prediction greatly reduces the size of the coded data. To be able to perform prediction, the earlier decoded pictures need to be stored, often temporarily, to the memory so that they can be quickly retrieved for prediction. When more and more pictures are decoded, older reference pictures need to be dropped away from the memory to e.g. make space for new ones. That is, some new pictures that have been decoded are marked to indicate that they are to be used for reference, and kept in the reference picture memory. Some decoded pictures are marked unused for reference and they can be dropped from the memory. To carry out this process effectively, the pictures to be used for reference can be signaled in the video transmission. However, additional signaling in the video transmission adds to the amount of data that needs to be sent.

There is, therefore, a need for solutions that improve the reference picture handling process without undermining coding efficiency.

SUMMARY

Now there has been invented an improved method and technical equipment implementing the method, by which the above problems are alleviated. Various aspects of the invention include a method, an apparatus, a server, a client and a computer readable medium comprising a computer program stored therein, which are characterized by what is stated in the independent claims. Various embodiments of the invention are disclosed in the dependent claims.

In the example embodiments, a reference picture marking process and a reference picture list management process may be handled in a unified reference picture marking and reference picture list management process. A new idle reference picture list may be used for handling reference pictures that are not used for reference in the current picture. Differential coding of picture order count may be used to increase coding efficiency. The reference picture management syntax structure may be sent in the picture parameter set for improved coding efficiency e.g. in regular GOP (group of pictures) arrangements.

According to a first aspect there is provided a method for video coding, comprising providing an indication in a syntax element, said indication indicative of a picture to be used as reference picture in decoding, and providing an instruction in said syntax element, said instruction indicative of a reference picture list structure, said reference picture list to be used in decoding.

According to an embodiment, the method further comprises providing at least one of said indication and said instruction in a picture parameter set for decoding, said picture parameter set being common to a number of picture slices to be decoded. According to an embodiment, the method further comprises coding said instruction using differential coding of a picture identifier such as a picture order count (POC). According to an embodiment, said instruction is indicative of a reference picture list structure that comprises an ordered list of reference pictures. According to an embodiment, the method further comprises providing an idle reference picture list instruction in said syntax element, said idle reference picture list instruction indicative of an idle reference picture list structure, pictures in said idle reference picture list to be used as reference pictures in decoding of another picture than the current picture. According to an embodiment, the method further comprises providing an identification of an algorithm to be used for adding and removing pictures from said idle reference picture list in case provision or transmission of said idle reference picture list can be at least partially omitted.

According to a second aspect, there is provided a method for video coding, comprising providing an idle reference picture list instruction in a syntax element, said idle reference picture list instruction indicative of an idle reference picture list structure, pictures in said idle reference picture list to be used as reference pictures in decoding of another picture than the current picture. According to an embodiment, the method comprises providing an identification of an algorithm to be used for adding and removing pictures from said idle reference picture list in case provision or transmission of said idle reference picture list can be at least partially omitted.

According to a third aspect, there is provided a method for decoding video data, comprising decoding from a bitstream an indication from a syntax element, said indication indicative of a picture to be used as reference picture in decoding, decoding an instruction from said syntax element, said instruction indicative of a reference picture list structure, said reference picture list to be used in decoding, and using said indication and said instruction in handling reference pictures in decoding of video data.

According to an embodiment, the method comprises decoding at least one of said indication and said instruction from a picture parameter set for decoding, said picture parameter set being common to a number of picture slices to be decoded. According to an embodiment, the method comprises decoding said instruction using differential decoding of a picture identifier such as a picture order count (POC). According to an embodiment, said instruction is indicative of a reference picture list structure that comprises an ordered list of reference pictures. According to an embodiment, the method comprises decoding an idle reference picture list instruction in said syntax element, said idle reference picture list instruction indicative of an idle reference picture list structure, pictures in said idle reference picture list to be used as reference pictures in decoding of another picture than the current picture. According to an embodiment, the method comprises decoding from a bitstream an identification of an algorithm to be used for adding and removing pictures from said idle reference picture list in case provision or transmission of said idle reference picture has been at least partially omitted.

According to a fourth aspect there is provided a method for decoding video data, comprising decoding an idle reference picture list instruction in a syntax element, said idle reference picture list instruction indicative of an idle reference picture list structure, pictures in said idle reference picture list to be used as reference pictures in decoding of another picture than the current picture. According to an embodiment, the method comprises decoding from a bitstream an identification of an algorithm to be used for adding and removing pictures from said idle reference picture list in case provision or transmission of said idle reference picture has been at least partially omitted.

According to a fifth aspect there is provided an apparatus comprising a processor, memory including computer program code, the memory and the computer program code configured to, with the processor, cause the apparatus to provide an indication in a syntax element, said indication indicative of a picture to be used as reference picture in decoding, and provide an instruction in said syntax element, said instruction indicative of a reference picture list structure, said reference picture list to be used in decoding.

According to an embodiment, the apparatus comprises computer program code configured to, with the processor, cause the apparatus to provide at least one of said indication and said instruction in a picture parameter set for decoding, said picture parameter set being common to a number of picture slices to be decoded. According to an embodiment, the apparatus comprises computer program code configured to, with the processor, cause the apparatus to code said instruction using differential coding of a picture identifier such as a picture order count (POC). According to an embodiment, said instruction is indicative of a reference picture list structure that comprises an ordered list of reference pictures. According to an embodiment, the apparatus comprises computer program code configured to, with the processor, cause the apparatus to provide a idle reference picture list instruction in said syntax element, said idle reference picture list instruction indicative of an idle reference picture list structure, pictures in said idle reference picture list to be used as reference pictures in decoding of another picture than the current picture. According to an embodiment, the apparatus comprises computer program code configured to, with the processor, cause the apparatus to provide an identification of an algorithm to be used for adding and removing pictures from said idle reference picture list in case provision or transmission of said idle reference picture list can be at least partially omitted.

According to a sixth aspect there is provided an apparatus comprising a processor, memory including computer program code, the memory and the computer program code configured to, with the processor, cause the apparatus to provide a idle reference picture list instruction in said syntax element, said idle reference picture list instruction indicative of an idle reference picture list structure, pictures in said idle reference picture list to be used as reference pictures in decoding of another picture than the current picture.

According to an embodiment, the apparatus comprises computer program code configured to, with the processor, cause the apparatus to provide an identification of an algorithm to be used for adding and removing pictures from said idle reference picture list in case provision or transmission of said idle reference picture list can be at least partially omitted.

According to a seventh aspect, there is provided an apparatus for decoding video data comprising a processor, memory including computer program code, the memory and the computer program code configured to, with the processor, cause the apparatus to decode from a bitstream an indication from a syntax element, said indication indicative of a picture to be used as reference picture in decoding, decode an instruction from said syntax element, said instruction indicative of a reference picture list structure, said reference picture list to be used in decoding, and use said indication and said instruction in handling reference pictures in decoding of video data.

According to an embodiment, the apparatus comprises computer program code configured to, with the processor, cause the apparatus to decode at least one of said indication and said instruction from a picture parameter set for decoding, said picture parameter set being common to a number of picture slices to be decoded. According to an embodiment, the apparatus comprises computer program code configured to, with the processor, cause the apparatus to decode said instruction using differential decoding of a picture identifier such as a picture order count (POC). According to an embodiment, said instruction is indicative of a reference picture list structure that comprises an ordered list of reference pictures. According to an embodiment, the apparatus comprises computer program code configured to, with the processor, cause the apparatus to decode an idle reference picture list instruction in said syntax element, said idle reference picture list instruction indicative of an idle reference picture list structure, pictures in said idle reference picture list to be used as reference pictures in decoding of another picture than the current picture. According to an embodiment, the apparatus comprises computer program code configured to, with the processor, cause the apparatus to decode from a bitstream an identification of an algorithm to be used for adding and removing pictures from said idle reference picture list in case provision or transmission of said idle reference picture has been at least partially omitted.

According to an eighth aspect, there is provided an apparatus comprising a processor, memory including computer program code, the memory and the computer program code configured to, with the processor, cause the apparatus to decode an idle reference picture list instruction in a syntax element, said idle reference picture list instruction indicative of an idle reference picture list structure, pictures in said idle reference picture list to be used as reference pictures in decoding of another picture than the current picture.

According to an embodiment, the apparatus comprises computer program code configured to, with the processor, cause the apparatus to decode from a bitstream an identification of an algorithm to be used for adding and removing pictures from said idle reference picture list in case provision or transmission of said idle reference picture has been at least partially omitted.

According to a ninth aspect, the apparatus described above is a transcoder element in a network.

According to a tenth aspect, there is provided a module for video coding comprising means for carrying out the method according to any of the aspects 1 to 4.

According to an eleventh aspect, there is provided a system comprising means for carrying out the method according to any of the aspects 1 to 4.

According to a twelfth aspect, there is provided an apparatus for encoding video data comprising means for providing an indication in a syntax element, said indication indicative of a picture to be used as reference picture in decoding, and means for providing an instruction in said syntax element, said instruction indicative of a reference picture list structure, said reference picture list to be used in decoding.

According to a thirteenth aspect, there is provided an apparatus for encoding video data comprising means for providing an idle reference picture list instruction in a syntax element, said idle reference picture list instruction indicative of an idle reference picture list structure, pictures in said idle reference picture list to be used as reference pictures in decoding of another picture than the current picture.

According to a fourteenth aspect, there is provided an apparatus for encoding video data comprising means for carrying out the method according to the first or second aspect.

According to a fifteenth aspect, there is provided an apparatus for decoding video data, comprising means for decoding from a bitstream an indication from a syntax element, said indication indicative of a picture to be used as reference picture in decoding, means for decoding an instruction from said syntax element, said instruction indicative of a reference picture list structure, said reference picture list to be used in decoding, and means for using said indication and said instruction in handling reference pictures in decoding of video data.

According to a sixteenth aspect, there is provided an apparatus for decoding video data, comprising means for decoding an idle reference picture list instruction in a syntax element, said idle reference picture list instruction indicative of an idle reference picture list structure, pictures in said idle reference picture list to be used as reference pictures in decoding of another picture than the current picture.

According to a seventeenth aspect, there is provided an apparatus for decoding video data comprising means for carrying out the method according to the third or fourth aspect.

According to an eighteenth aspect, there is provided a computer program product comprising computer program code embodied on a non-transitory computer-readable memory, said computer program code comprising a computer program code section for providing an indication in a syntax element, said indication indicative of a picture to be used as reference picture in decoding, and a computer program code section for providing an instruction in said syntax element, said instruction indicative of a reference picture list structure, said reference picture list to be used in decoding.

According to a nineteenth aspect, there is provided a computer program product comprising computer program code embodied on a non-transitory computer-readable memory, said computer program code comprising a computer program code section for providing an idle reference picture list instruction in a syntax element, said idle reference picture list instruction indicative of an idle reference picture list structure, pictures in said idle reference picture list to be used as reference pictures in decoding of another picture than the current picture.

According to a twentieth aspect, there is provided a computer program product comprising computer program code embodied on a non-transitory computer-readable memory, said computer program code comprising a computer program code section for decoding from a bitstream an indication from a syntax element, said indication indicative of a picture to be used as reference picture in decoding, a computer program code section for decoding an instruction from said syntax element, said instruction indicative of a reference picture list structure, said reference picture list to be used in decoding, and a computer program code section for using said indication and said instruction in handling reference pictures in decoding of video data.

According to an twenty-first aspect, there is provided a computer program product comprising computer program code embodied on a non-transitory computer-readable memory, said computer program code comprising a computer program code section for decoding an idle reference picture list instruction in a syntax element, said idle reference picture list instruction indicative of an idle reference picture list structure, pictures in said idle reference picture list to be used as reference pictures in decoding of another picture than the current picture.

According to an twenty-second aspect, there is provided a computer program product comprising computer program code embodied on a non-transitory computer-readable memory, said computer program code comprising instructions that can cause a computer to carry out a method according to any of the aspects 1 to 4 when executed on at least one processor of the computer.

DRAWINGS

In the following, various embodiments of the invention will be described in more detail with reference to the appended drawings, in which FIG. 1 shows a block diagram of a video coding system according to an example embodiment;

DESCRIPTION OF EXAMPLE EMBODIMENTS

Figure 1:
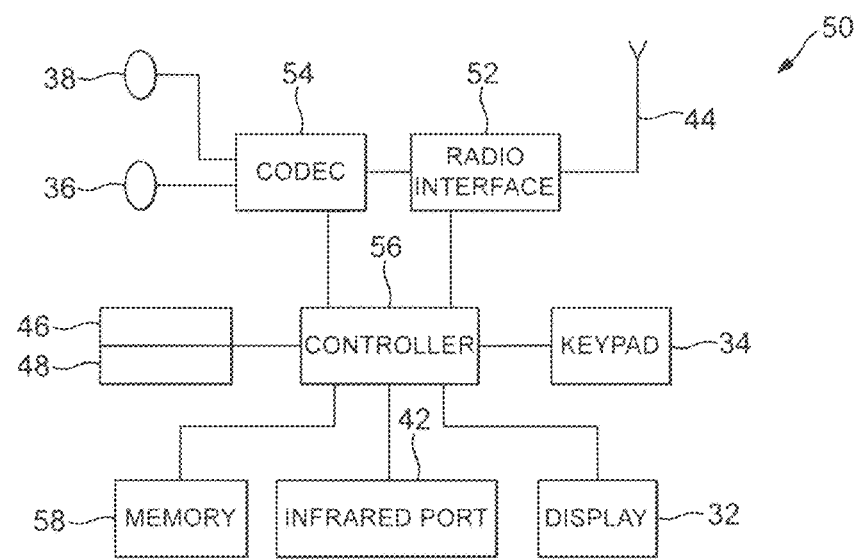

In the following, several embodiments of the invention will be described in the context of one video coding arrangement. It is to be noted, however, that the invention is not limited to this particular arrangement. In fact, the different embodiments have applications widely in any environment where improvement of reference picture handling is required. For example, the invention may be applicable to video coding systems like streaming systems, DVD and DB players, systems and computer programs on personal computers, handheld computers and communication devices, as well as network elements such as transcoders and cloud computing arrangements where video data is handled.

The H.264/AVC standard was developed by the Joint Video Team (JVT) of the Video Coding Experts Group (VCEG) of the Telecommunications Standardisation Sector of International Telecommunication Union (ITU-T) and the Moving Picture Experts Group (MPEG) of International Standardisation Organisation (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

There is a currently ongoing standardization project of High Efficiency Video Coding (HEVC) by the Joint Collaborative Team-Video Coding (JCT-VC) of VCEG and MPEG.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in the current working draft of HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. In H.264/AVC, a picture may either be a frame or a field. In the current working draft of HEVC, a picture is a frame. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

In the draft HEVC, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. The PU splitting can be realized by splitting the CU into four equal size square PUs or splitting the CU into two rectangle PUs vertically or horizontally in a symmetric or asymmetric way. The division of the image into CUs, and division of CUs into PUs and TUs is typically signalled in the bitstream allowing the decoder to reproduce the intended structure of these units.

In the draft HEVC, a picture can be partitioned in tiles, which are rectangular and contain an integer number of LCUs. In the current working draft of HEVC, the partitioning to tiles forms a regular grid, where heights and widths of tiles differ from each other by one LCU at the maximum. In the draft HEVC, a slice consists of an integer number of CUs. The CUs are scanned in the raster scan order of LCUs within tiles or within a picture, if tiles are not in use. Within an LCU, the CUs have a specific scan order.

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units are typically encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention is performed always regardless of whether the bytestream format is in use or not.

NAL units consist of a header and payload. In H.264/AVC and HEVC, the NAL unit header indicates the type of the NAL unit and whether a coded slice contained in the NAL unit is a part of a reference picture or a non-reference picture. H.264/AVC includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The draft HEVC includes a 1-bit nal_ref_idc syntax element, which when equal to 0 indicates that a coded slice contained in the NAL unit is a part of a non-reference picture and when equal to 1 indicates that a coded slice contained in the NAL unit is a part of a reference picture. The header for SVC and MVC NAL units additionally contains various indications related to the scalability and multiview hierarchy. In HEVC, the NAL unit header includes the temporal_id syntax element, which specifies a temporal identifier for the NAL unit. The bitstream created by excluding all VCL NAL units having a temporal_id greater than or equal to a selected value and including all other VCL NAL units remains conforming. Consequently, a picture having temporal_id equal to TID does not use any picture having a temporal_id greater than TID as inter prediction reference. In the draft HEVC, the reference picture list initialization is limited to only reference picture marked as "used for reference" and having a temporal_id less than or equal to the temporal_id of the current picture.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU. In H.264/AVC and HEVC a coded slice NAL unit can be indicated to be a coded slice in an Instantaneous Decoding Refresh (IDR) picture or coded slice in a non-IDR picture. In HEVC, a coded slice NAL unit can be indicated to be a coded slice in a Clean Decoding Refresh (CDR) picture (which may also be referred to as a Clean Random Access picture).

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets are essential for the reconstruction of decoded pictures, whereas many of the other non-VCL NAL units are not necessary for the reconstruction of decoded sample values.

Parameters that remain unchanged through a coded video sequence are included in a sequence parameter set. In addition to the parameters that are essential to the decoding process, the sequence parameter set may optionally contain video usability information (VUI), which includes parameters that are important for buffering, picture output timing, rendering, and resource reservation. A picture parameter set contains such parameters that are likely to be unchanged in several coded pictures. In the draft HEVC, there is also a third type of parameter sets, here referred to as Adaptation Parameter Set (APS), which includes parameters that are likely to be unchanged in several coded slices.

H.264/AVC and HEVC syntax allows many instances of parameter sets, and each instance is identified with a unique identifier. In H.264/AVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

An SEI NAL unit contains one or more SEI messages, which are not required for the decoding of output pictures but assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC consists of the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In the draft HEVC, no redundant coded picture has been specified.

In H.264/AVC and HEVC, an access unit consists of a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next, followed by coded slices for zero or more redundant coded pictures.

A coded video sequence is defined to be a sequence of consecutive access units in decoding order from an IDR access unit, inclusive, to the next IDR access unit, exclusive, or to the end of the bitstream, whichever appears earlier.

A group of pictures (GOP) is and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CDR NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC. The NAL unit header indicates the type of the NAL unit and whether a coded slice contained in the NAL unit is a part of a reference picture or a non-reference picture.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may be also referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). H.264/AVC and HEVC, as many other video compression standards, divides a picture into a mesh of rectangles, for each of which a similar block in one of the reference pictures is indicated for inter prediction. The location of the prediction block is coded as motion vector that indicates the position of the prediction block compared to the block being coded.

Inter prediction process may be characterized using one or more of the following factors.

The Accuracy of Motion Vector Representation.

For example, motion vectors may be of quarter-pixel accuracy, and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion Vector Prediction.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Differential coding of motion vectors is typically disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P or slices may be uni-predicted or intra-predicted. The reference pictures for a bi-predictive picture are not limited to be the subsequent picture and the previous picture in output order, but rather any reference pictures can be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to predicting from a reference picture in reference picture list 0, and prediction in backward direction may refer to predicting from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In the draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU.

In some coding formats and codecs, a distinction is made between so-called short-term and long-term reference pictures. This distinction may affect some decoding processes such as motion vector scaling in the temporal direct mode or implicit weighted prediction. If both of used reference pictures for the temporal direct mode are short-term reference pictures, the motion vector used in the prediction may be scaled according to the POC difference between the current picture and each of the reference pictures. However, if at least one reference picture for the temporal direct mode is a long-term reference picture, default scaling of the motion vector is used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, the a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

H.264/AVC and the draft HEVC specify the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control requires the presence of memory management control operation (MMCO) parameters in the bitstream. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC and HEVC causes all reference pictures except for the current picture to be marked as "unused for reference". An instantaneous decoding refresh (IDR) picture contains only intra-coded slices and causes a similar "reset" of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as reference and needed for output.

In many coding modes of H.264/AVC and HEVC, the reference picture for inter prediction is indicated with an index to a reference picture list. The index is coded with variable length coding, i.e., the smaller the index is, the shorter the corresponding syntax element becomes. Two reference picture lists (reference picture list 0 and reference picture list 1) are generated for each bi-predictive (B) slice, and one reference picture list (reference picture list 0) is formed for each inter-coded (P) slice.

Typical high efficiency video codecs such as the draft HEVC codec employ an additional motion information coding/decoding mechanism, often called merging/merge mode/process/mechanism, where all the motion information of a block/PU is predicted and used without any modification/correction. The aforementioned motion information for a PU comprises 1) The information whether 'the PU is uni-predicted using only reference picture list 0' or 'the PU is uni-predicted using only reference picture list 1' or 'the PU is bi-predicted using both reference picture list 0 and list 1' 2) Motion vector value corresponding to the reference picture list 0 3) Reference picture index in the reference picture list 0 4) Motion vector value corresponding to the reference picture list 1 5) Reference picture index in the reference picture list 1. Similarly, predicting the motion information is carried out using the motion information of adjacent blocks and/or co-located blocks in temporal reference pictures. Typically, a list, often called as merge list, is constructed by including motion prediction candidates associated with available adjacent/co-located blocks and the index of selected motion prediction candidate in the list is signalled. Then the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism is also employed for individual PUs (not necessarily the whole CU as in skip mode) and in this case, prediction residual may be utilized to improve prediction quality. This type of prediction mode is typically named as inter-merge mode.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands contained in slice headers. The RPLR commands indicate the pictures that are ordered to the beginning of the respective reference picture list. This second step may also referred to as the reference picture list modification process and the RPLR commands may be included in a reference picture list modification syntax structure.

The merge list may be generated on the basis of reference picture list 0 and/or reference picture list 1 for example using the reference picture lists combination syntax structure included in the slice header syntax. There may be a reference picture lists combination syntax structure, created into the bitstream by an encoder and decoded from the bitstream by a decoder, which indicates the contents of the merge list. The syntax structure may indicate that the reference picture list 0 and the reference picture list 1 are combined to be an additional reference picture lists combination used for the prediction units being uni-directional predicted. The syntax structure may include a flag which, when equal to a certain value, indicates that the reference picture list 0 and reference picture list 1 are identical thus reference picture list 0 is used as the reference picture lists combination. The syntax structure may include a list of entries, each specifying a reference picture list (list 0 or list 1) and a reference index to the specified list, where an entry specifies a reference picture to be included in the merge list.

A syntax structure for reference picture marking may exist in a video coding system. For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

It has been noticed here that surprisingly, the reference picture marking arrangement may be modified in a certain manner so that in the same process, at least one reference picture list may be constructed and/or managed. To a skilled person, mere addition of a list management system to the marking arrangement would lead to a system with inefficiencies in terms of coding. However, in the present example embodiments, efficiencies have surprisingly been achieved by employing a synergy between the reference picture marking process and a list management process and/or by employing various other coding improvements.

A reference picture lists syntax structure may include three parts, reference picture list 0 description for P and B slices, reference picture list 1 description for B slices, and idle reference picture list description for any slices including those reference pictures that are not included in either reference picture list 0 or 1 but are still to be kept marked as "used for reference". In other words, there may e.g. be one syntax structure (instead of more than one) that provides the information for both reference picture marking and reference picture list construction.

When the decoding of a slice starts, the reference picture lists syntax structure may be parsed. For P and B slices, the syntax structure includes a reference picture list description for list 0, which is decoded. The reference picture list description syntax structure may list pictures identified by their picture order count (POC) value in the order they appear in the reference picture list. For B slices, the reference picture lists syntax structure may include a reference picture list description for list 1, which is decoded.

A reference picture list initialization process and/or reference picture list modification process may be omitted, and the reference picture lists may be directly described in the syntax structures.

Additionally or instead, the reference picture lists syntax structure may include a reference picture list description for an idle reference picture list, which, if present, is decoded.

Pictures that are in any of the reference picture lists may be marked as "used for reference". Pictures that are in no reference picture list may be marked as "unused for reference".

In other words, a reference picture list construction and reference picture marking processes and syntax structures may be handled in a single unified process and syntax structure.

Figure 2:
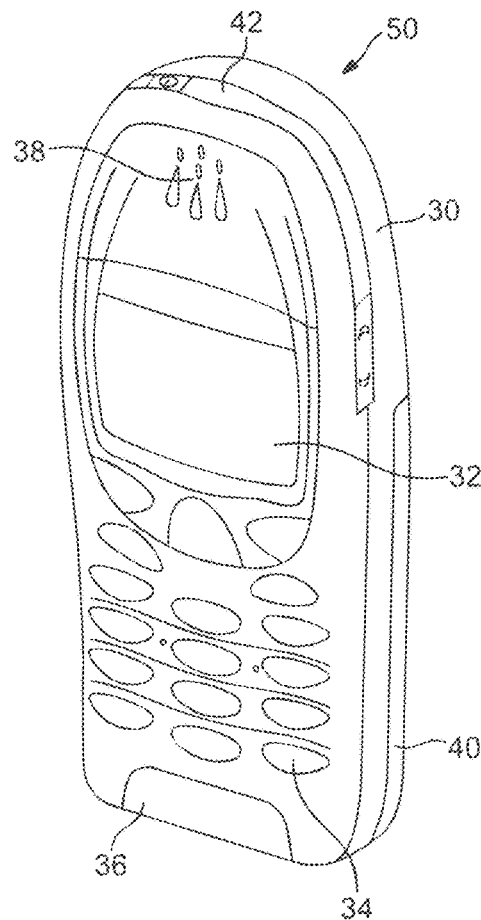
FIG. 2 shows an apparatus for video coding according to an example embodiment.

FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
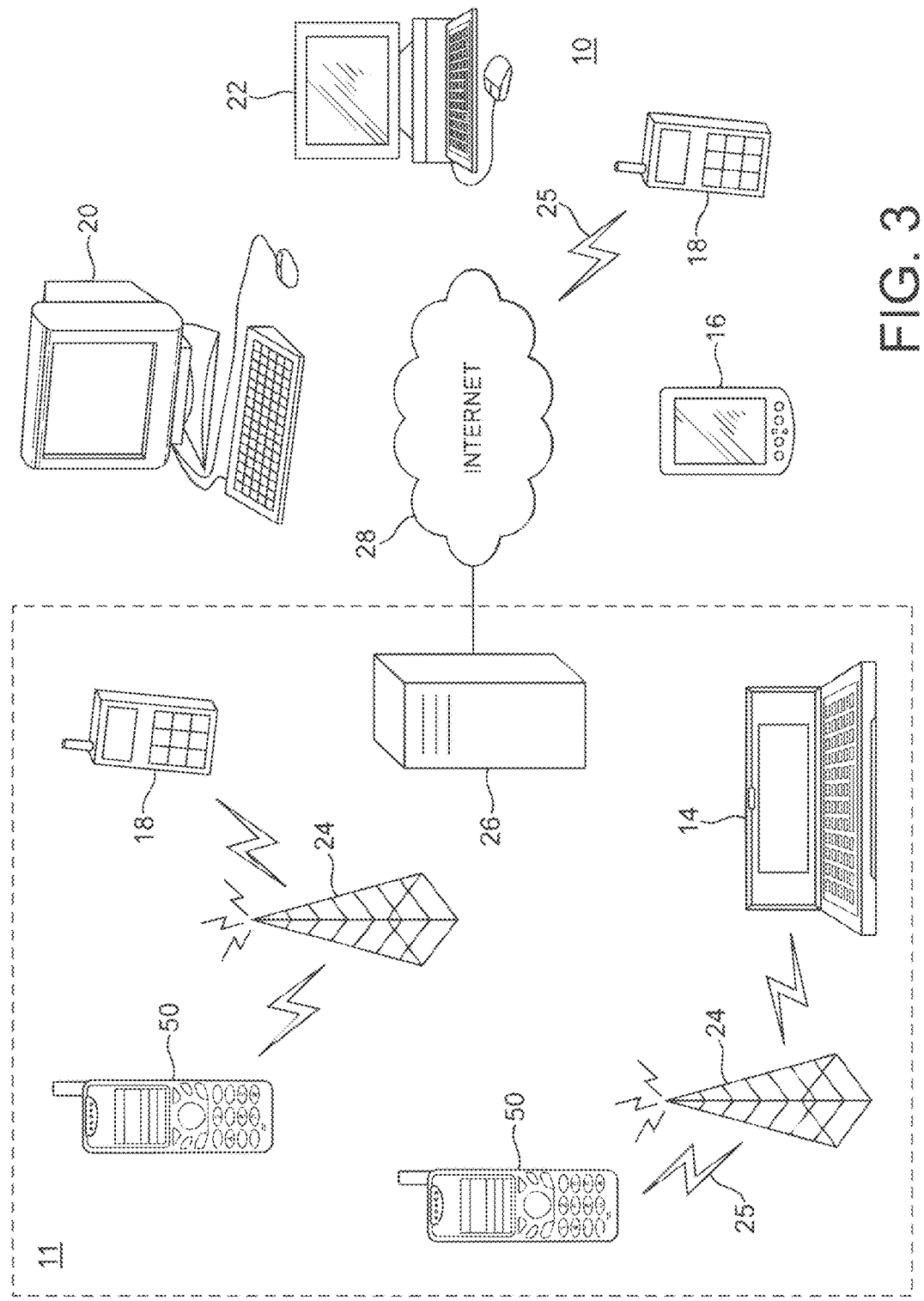
FIG. 3 shows an arrangement for video coding comprising a plurality of apparatuses, networks and network elements according to an example embodiment.

FIG. 3 shows an arrangement for video coding comprising a plurality of apparatuses, networks and network elements according to an example embodiment. With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
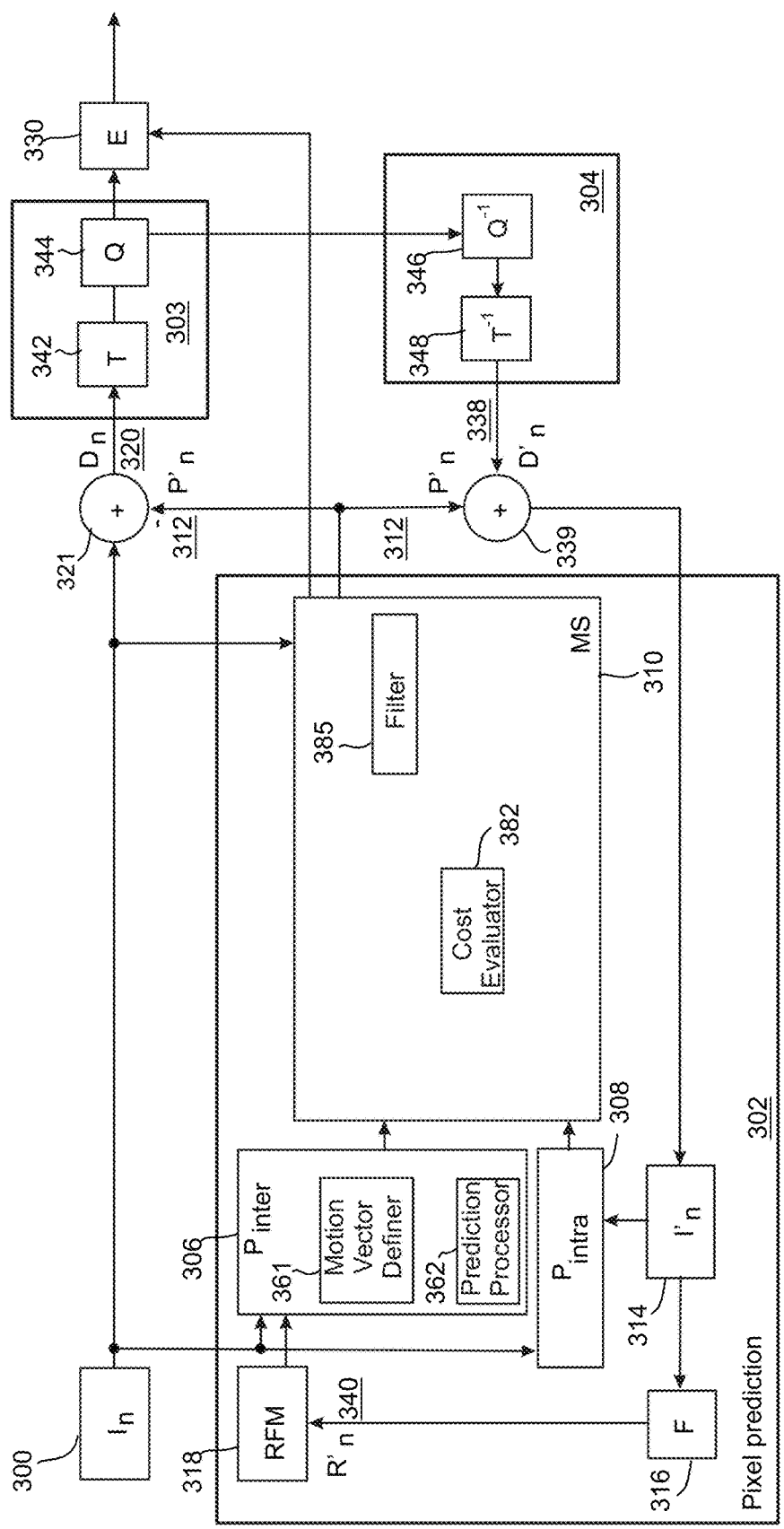
FIGS. 4a and 4b show block diagrams for video encoding and decoding according to an example embodiment.
Figure 4B:
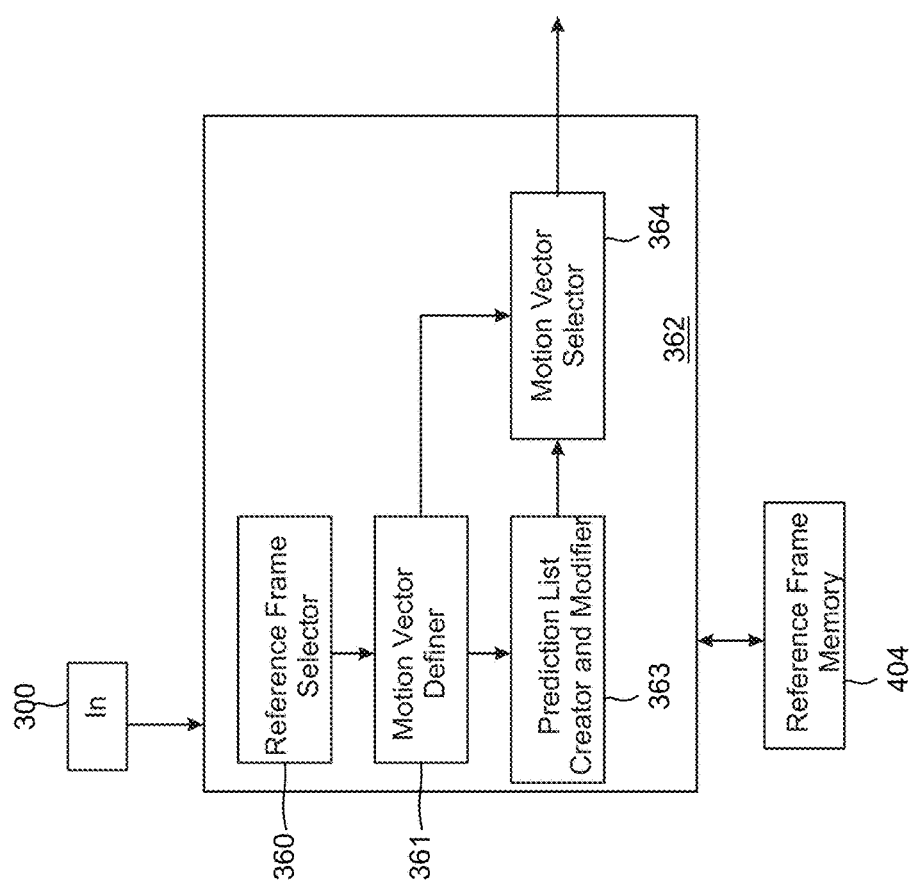

FIGS. 4a and 4b show block diagrams for video encoding and decoding according to an example embodiment.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. In this embodiment the mode selector 310 comprises a block processor 381 and a cost evaluator 382. The encoder may further comprise an entropy encoder 330 for entropy encoding the bit stream.

FIG. 4b depicts an embodiment of the inter predictor 306. The inter predictor 306 comprises a reference frame selector 360 for selecting reference frame or frames, a motion vector definer 361, a prediction list former 363 and a motion vector selector 364. These elements or some of them may be part of a prediction processor 362 or they may be implemented by using other means.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. Both the inter-predictor 306 and the intra-predictor 308 may have more than one intra-prediction modes. Hence, the inter-prediction and the intra-prediction may be performed for each mode and the predicted signal may be provided to the mode selector 310. The mode selector 310 also receives a copy of the image 300.

The mode selector 310 determines which encoding mode to use to encode the current block. If the mode selector 310 decides to use an inter-prediction mode it will pass the output of the inter-predictor 306 to the output of the mode selector 310. If the mode selector 310 decides to use an intra-prediction mode it will pass the output of one of the intra-predictor modes to the output of the mode selector 310.

The mode selector 310 may use, in the cost evaluator block 382, for example Lagrangian cost functions to choose between coding modes and their parameter values, such as motion vectors, reference indexes, and intra prediction direction, typically on block basis. This kind of cost function uses a weighting factor λ—to tie together the (exact or estimated) image distortion due to lossy coding methods and the (exact or estimated) amount of information that is required to represent the pixel values in an image area: C=D+λ−R, where C is the Lagrangian cost to be minimized, D is the image distortion (e.g. Mean Squared Error) with the mode and their parameters, and R the number of bits needed to represent the required data to reconstruct the image block in the decoder (e.g. including the amount of data to represent the candidate motion vectors).

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations. In many embodiments the reference frame memory 318 may be capable of storing more than one decoded picture, and one or more of them may be used by the inter-predictor 306 as reference pictures against which the future image 300 are compared in inter prediction operations. The reference frame memory 318 may in some cases be also referred to as the Decoded Picture Buffer The operation of the pixel predictor 302 may be configured to carry out any known pixel prediction algorithm known in the art.

The pixel predictor 302 may also comprise a filter 385 to filter the predicted values before outputting them from the pixel predictor 302.

The operation of the prediction error encoder 302 and prediction error decoder 304 will be described hereafter in further detail. In the following examples the encoder generates images in terms of 16×16 pixel macroblocks which go to form the full image or picture. However, it is noted that FIG. 4a is not limited to block size 16×16, but any block size and shape can be used generally, and likewise FIG. 4a is not limited to partitioning of a picture to macroblocks but any other picture partitioning to blocks, such as coding units, may be used. Thus, for the following examples the pixel predictor 302 outputs a series of predicted macroblocks of size 16×16 pixels and the first summing device 321 outputs a series of 16×16 pixel residual data macroblocks which may represent the difference between a first macroblock in the image 300 against a predicted macroblock (output of pixel predictor 302).

The prediction error encoder 303 comprises a transform block 342 and a quantizer 344. The transform block 342 transforms the first prediction error signal 320 to a transform domain. The transform is, for example, the DCT transform or its variant. The quantizer 344 quantizes the transform domain signal, e.g. the DCT coefficients, to form quantized coefficients.

The prediction error decoder 304 receives the output from the prediction error encoder 303 and produces a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal approximately and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

In the following the operation of an example embodiment of the inter predictor 306 will be described in more detail. The inter predictor 306 receives the current block for inter prediction. It is assumed that for the current block there already exists one or more neighboring blocks which have been encoded and motion vectors have been defined for them. For example, the block on the left side and/or the block above the current block may be such blocks. Spatial motion vector predictions for the current block can be formed e.g. by using the motion vectors of the encoded neighboring blocks and/or of non-neighbor blocks in the same slice or frame, using linear or non-linear functions of spatial motion vector predictions, using a combination of various spatial motion vector predictors with linear or non-linear operations, or by any other appropriate means that do not make use of temporal reference information. It may also be possible to obtain motion vector predictors by combining both spatial and temporal prediction information of one or more encoded blocks. These kinds of motion vector predictors may also be called as spatio-temporal motion vector predictors.

Reference frames used in encoding may be stored to the reference frame memory. Each reference frame may be included in one or more of the reference picture lists, within a reference picture list, each entry has a reference index which identifies the reference frame. When a reference frame is no longer used as a reference frame it may be removed from the reference frame memory or marked as "unused for reference" or a non-reference frame wherein the storage location of that reference frame may be occupied for a new reference frame.

Reference picture marking may be based on the presence of a picture in any of the reference picture lists, e.g. reference picture list 0, reference picture list 1, and an idle reference picture list. A picture not present in any of these lists may be marked as "unused for reference". No decoded reference picture marking syntax may be needed in the encoding, transmission and decoding, which may simplify the coding process and also reduce the need for signaling, thereby possibly increasing coding efficiency.

Figure 5:
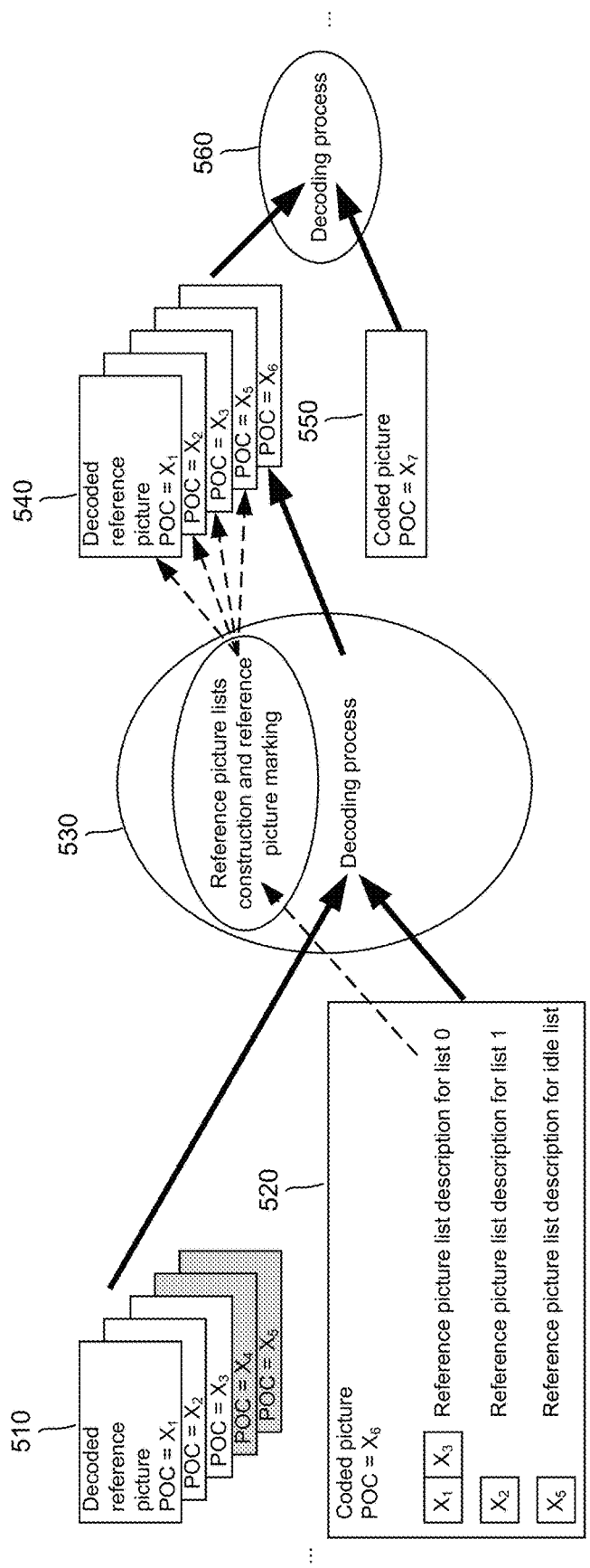
FIG. 5 illustrates reference picture handling according to an example embodiment.

FIG. 5 illustrates reference picture handling in a decoder according to an example embodiment.

As a result of decoding of previous pictures there are five decoded reference pictures 510 marked as "used for reference", when the decoding process 530 of a coded picture having POC equal to $X_6$ is about to start. The five decoded reference pictures 510 have POC values equal to $X_1, X_2, X_3, X_4$, and $X_5$, respectively.

The coded picture having POC equal to $X_6$ contains reference picture list description syntax structures 520 for reference picture list 0, reference picture list 1, and the idle reference picture list. These syntax structures 520 indicate POC values to be included in the respective reference picture lists. To be more exact, the syntax structures indicate that decoded reference pictures having POC values equal to $X_1$ and $X_3$, in that indicated order, are included in reference picture list 0, decoded reference picture having POC value equal to $X_2$ is included in reference picture list 1, and decoded reference picture having POC value equal to $X_5$ is included in the idle reference picture list.

The decoding process 530 for the coded picture having POC equal to $X_6$ includes a united reference picture lists construction and reference picture marking process. The reference picture lists are constructed from the reference picture list description syntax structures (illustrated by the inward dashed arrows). Reference pictures that are in any of the three lists (reference picture list 0, reference picture list 1, or the idle reference picture list) are marked as "used for reference" (illustrated by the outward dashed arrows) and are therefore available as reference pictures for decoding of the subsequent coded picture too. Reference pictures that are in no one of the three lists, i.e. reference picture having POC equal to $X_4$ in this case, are marked as "unused for reference" and are therefore not used as reference pictures for decoding of any subsequent coded picture. If a picture is marked as "unused for reference" and has already been output from the decoder, it can be removed or the memory space used for it can be re-used for another decoded picture.

The decoding process for the coded picture having POC equal to $X_6$ uses reference picture list 0 and list 1 and may use any decoded reference picture in these two lists. The decoding process the coded picture having POC equal to $X_6$ does not use decoded reference pictures that are in the idle reference picture list or are marked as "unused for reference", both illustrated with gray shading in FIG. 5.

In this example, the coded picture having POC equal to $X_6$ is a reference picture (i.e. nal_ref_idc is greater than 0). Thus, the decoded reference picture having POC equal to $X_6$ is marked as "used for reference" and is available for decoding of the subsequent coded pictures.

The decoding process then continues 560 for the subsequent picture, i.e. the coded picture 550 having POC equal to $X_7$ in a similar fashion than the decoding process 530 for the coded picture having POC equal to $X_6$.

Reference picture lists may be specified through a reference picture list description syntax structure. One reference picture list description structure may exist for each reference picture list in the reference picture lists ref_pic_lists( ) syntax structure. The ref_pic_lists( ) syntax structure can reside in a picture parameter set (PPS) or in a slice header, for example. A reference picture list initialization process may be omitted, thereby providing simplicity and coding efficiency. Reference picture list modification syntax structure and decoding process for the same may also be removed in order to provide simplicity through the unified list management and reference picture marking process.

Instead of unordered list of reference pictures, ordered reference picture lists (0, 1, and Idle) may be provided. With this arrangement, reference picture list initialisation and modification may become unnecessary and the corresponding encoding and decoding processes and syntax elements may be avoided.

It is noted that even though the reference pictures in the idle reference picture list have a specified order determined by the reference picture list description syntax structure, there are usually not specific requirements in which order the encoder should list the idle reference pictures. In some sense, the idle reference picture list may often be considered an unordered list or a set.

In general, decoders may not receive a coded picture that have been a part of the encoded bitstream for two reasons: either the coded picture has been accidentally lost during transmission or in a storage medium, or the coded picture has been removed intentionally for example to adjust the bitrate or decoding complexity or to provide special functionality, such as fast forward play. Decoder's response to a missing coded picture should often differ based on the fact whether the picture loss was accidental or intentional. For example, if the picture loss was accidental, the decoder may conceal the lost picture, request for a retransmission of the lost picture, or inform the far-end encoder not to use the lost picture as a reference picture for subsequent coded pictures. In contrast, if the picture loss was intentional, the decoder should typically just continue decoding. In order to differentiate between accidentally and intentionally missing coded pictures, an unordered list of reference pictures should also contain additional information per each reference picture, such as the temporal_id of the reference picture or information whether the reference picture is used as reference for the current picture to be decoded. Then, if the unordered list of reference pictures includes a reference picture, which is indicated to be a potential reference picture for the current picture to be decoded, for example through having a temporal_id value lower than that of the current picture, and that reference picture has not been decoded, it can be concluded that the reference picture has been accidentally lost. Unlike in unordered list of reference pictures and subsequent reference picture list initialisation, the temporal identification temporal_id or whether the reference picture is used as reference for the current picture to be decoded may not need to be given for reference pictures because reference picture lists are explicitly specified for example through POC values. Hence, if an explicitly-specified reference picture list contains a reference picture that has not been decoded, it can be concluded that the reference picture has been accidentally lost.

Including reference picture lists ref_pic_lists( ) syntax structure in a picture parameter set PPS may be beneficial for regular group of pictures GOP and/or prediction structures, for example. In other words, the described reference picture marking and/or reference picture list handling structure may be formed into and transmitted in a picture parameter set or another structure that can be used for more than one picture slice and/or for more than one picture. In the case the structure of a group of pictures (GOP) remaining the same or essentially the same, the reference picture list description (marking and list management) may remain essentially the same for a plurality of slices, a plurality of pictures and even for a plurality of groups of pictures (GOP). Alternatively or in addition to PPS, the reference picture lists ref_pic_lists( ) syntax structure may be included in other types of parameter sets, such as sequence parameter set SPS or adaptation parameter set APS.

If the ref_pic_lists( ) syntax structure is present in multiple levels syntax structures, such as both in PPS and slice header, that are active or in force, there may be specific rules, which one or ones of the syntax structure are in force and used in the decoder. For example, it may be specified that the ref_pic_lists( ) in the slice header (if present) overrides that in the APS (if present) which overrides that in the PPS (if present) which overrides that in the SPS (if present). In some embodiments, the ref_pic_lists( ) syntax element or alike in one level of the coding structure hierarchy may include only some of the reference picture lists, in which case there may be specific rules from which syntax structure the other reference picture lists are inherited. For example, it may be specified that if the any missing reference picture lists in the ref_pic_lists( ) of the slice header are inherited from the respective reference picture lists in the ref_pic_lists( ) of the active PPS.

An idle reference picture list may be added into a syntax so that an idle reference picture list may be used at the encoder to convey information of idle reference pictures to the decoder. The idle reference picture list may contain reference pictures that are not used for reference in the current picture but may be used for reference in subsequent pictures in decoding order. In other words, the idle reference picture list may serve as a structure where reference pictures are put for later use, since they may not yet be marked "unused for reference". When compared to including all pictures marked as "used for reference" in at least one of reference picture list 0 and 1, putting some of the reference pictures onto another list, such as the idle reference picture list, may e.g. improve coding efficiency for the current picture because only the pictures used as reference for the current picture are on the active reference picture list(s), e.g. list 0 and list 1. The idle reference picture list concept may be used with a traditional reference picture list management and marking process, and/or with the unified reference picture list management and marking process described here.

In some embodiments, reference picture list 0 and list 1 may contain reference pictures that are indicated to be unused for reference for the current slice. For example, a reference index beyond num_ref_idx_l0_active_minus1 may not be used for reference for the current slice. It may be specified that such non-referenced reference pictures in reference picture list 0 and list 1 are marked as "used for reference". Alternatively, it may be specified that if a reference picture is only included as non-referenced reference picture in list 0 or list 1 and not in the idle reference picture list or as referenced reference picture in list 0 or list 1 it is marked as "unused for reference". Alternatively, the desired marking rule between the two above-mentioned ones or any other deterministic marking rule may be controlled by the encoder and indicated in the bitstream for example in the sequence parameter set SPS syntax. Including a reference picture as a non-reference reference picture in list 0 or list 1 may be preferred over including it in the idle reference picture list for example if fewer bits are consumed in encoding.

In some embodiments, the encoder may omit the inclusion of the reference picture list description for the idle reference picture list into the bitstream, if the reference picture lists 0 and 1 already contain a maximum number of unique reference pictures. In other words, the presence of the idle reference picture list description could be made conditional on whether the reference picture list 0 and list 1 contain fewer than the maximum amount of unique reference pictures.

In some embodiments, forming a structure and transmitting the idle reference picture list may be avoided or it could be sent optionally. In this case, the decoder inherits the reference picture marking as "used for reference" or "unused for reference" from the previous decoded picture. If the number of reference pictures is equal to (or greater than) the maximum number of reference pictures as determined in the active sequence parameter set SPS and/or by the coding profile and level in use and the current picture is a reference picture, a reference picture which is marked as "used for reference" is selected to be marked as "unused for reference". For this purpose (i.e. if one or more new slots in the idle reference picture list are needed), there may be a rule according to which a reference picture is marked as "unused for reference". Such a rule or algorithm may be inherently present in the decoder, or it may be communicated from the encoder to the decoder with a rule identifier. For example, first the reference pictures that are in any of the reference picture lists (e.g. reference picture list 0, reference picture list 1, and the idle reference picture list) are omitted from consideration, and then the reference picture that is the first in decoding order among the remaining reference pictures is selected to be marked as "unused for reference". Consequently, a picture is required to be included in the included in idle reference picture list syntax structure only if it is not in included in the other reference picture lists, if it were marked as "unused for reference" without including it in the idle reference picture list, and if the encoder wants to keep it marked as "used for reference". Consequently, it may not be required to send the idle reference picture list to the decoder, or it may be sent less frequently, or it may contain fewer pictures. Also, detection of a picture loss may be delayed until the next picture having equal or higher temporal identification (e.g. temporal_id) than the lost picture, because only those pictures may refer to the lost picture in the inter prediction process and hence have the lost picture in reference picture list 0 or list 1.

In some embodiments, the algorithm to select the picture(s) to be marked as "unused for reference" from the idle reference picture list may be indicated by the encoder in the bitstream for example in the sequence parameter set SPS syntax. For example, one indication or syntax element value may indicate that any picture that is not in reference picture list 0, reference picture list 1, or the idle reference picture list is marked as "unused for reference". Another indicated or syntax element value may indicate that the transmission of the idle reference picture list is optional and the reference picture to be marked as "unused for reference" is selected as the earliest (in decoding order) of those reference pictures that are not included in any reference picture list.

In some embodiments, a newly decoded reference picture (e.g. picture having nal_ref_idx greater than 0 in HEVC) is added by default in the idle reference picture list for subsequent pictures. In some embodiments, the algorithm to select the picture(s) to be included in the idle reference picture list may be indicated by the encoder in the bitstream for example in the SPS syntax. For example, it may be indicated in the SPS that nested temporal scalability is in use and hence a picture at temporal_id equal to TID does not use any picture having the same or higher temporal_id as reference. Consequently, it may be indicated in the SPS that a picture is included in the idle reference picture list only if it has a temporal_id that is lower than the maximum temporal_id of the bitstream.

The reference pictures may be identified with a picture order count (POC) in the reference picture list description. The POC of the current picture may be indicated with syntax element(s) in the slice header. In some embodiments, one coding mode for POC may be used e.g. to reduce implementation options, while in other embodiments more than one method to code POC may be allowed, for example three options as specified in H.264/AVC may be used to improve coding efficiency. Syntax elements related to the other POC types may thus be removed from the syntax and coding may be simplified. The POC decoding process, POC related equations (e.g. POC differences), and picture output in the hypothetical reference decoder HRD may be adapted from existing processes e.g. from H.264/AVC codec.

In some embodiments, the reference pictures may be identified with a another or additional picture identifier than picture order count (POC) in the reference picture list description. For example, some embodiments may use frame_num. Some embodiments may use a combination of POC and a view identifier for multiview video coding.

Some elements related to frame numbering in the syntax such as frame number frame_num and allowed gaps in frame number gaps_in_frame_num_allowed syntax elements may be removed and avoided in processing and transmission, as they may no longer be needed for picture order count (POC) decoding or decoded reference picture marking.

A reference picture list description syntax structure may be optimized in terms of overhead e.g. when the current picture has a different picture order count most significant bits (POC MSB) value than many or most of the reference pictures. This may be achieved e.g. by using delta or differential signaling in reference picture list description, so that the reference pictures are identified with respect to a base picture order count (POC) value and only the difference needs to be transmitted. This arrangement may allow placing the reference picture list description flexibly e.g. in a picture parameter set (PPS), too.

The reference picture list description syntax structure may use differential coding of picture order count values (POCs) for compression efficiency as well as for enabling the inclusion of the structure in a picture parameter set PPS. Furthermore, POC differences may be coded at a specified granularity, and the granularity at each temporal identification temporal_id may be provided in a sequence parameter set SPS. Specifying the granularity or constant interval of POC values for consequent pictures at a certain temporal_id value may be possible when a constant GOP structure is used and may improve compression efficiency. Furthermore, it may be controlled with a flag or similar if all the POC differences in a single reference picture list description syntax structure have same sign. For example, it may be specified that the POC differences for reference picture list 0 are negative compared to the current POC, i.e. that the POC values of the reference pictures in reference picture list 0 are smaller than the POC value of the current picture. Finally, the differential POC may be coded in two parts, where the first part is fixed-length coded and the second part is variable-length coded, in order to achieve compression improvement. The fixed-length coded part may be coded as an unsigned integer and the length or the number of bits of the fixed-length coded part may be controlled by a parameter in a sequence parameter set SPS. For example, the length of the fixed-length part may be controlled by poc_granularity_minus1 syntax element in the sequence parameter set SPS. The length or the number of bits of the fixed-length coded part also determines the POC difference for one POC cycle. The variable-length coded part may indicate the number of POC cycles between the POC of the current picture and the POC of a picture in the described reference picture list. In other words, "long-term" pictures may be addressed by adding/subtracting a variable-length coded POC cycle from the POC value obtained by the differential "short-term" fixed-length POC difference. The variable-length part may be optionally present, and if the variable-length part is not present for a picture, then the POC cycle of that picture is the same as the POC cycle for the current picture.

In some embodiments, the encoder may control the assignment of pictures as long-term reference pictures (or pictures marked as "used for long-term reference") through selection of POC values for pictures and selection of the size of the POC cycle. Reference pictures that are included in reference picture list 0 or list 1 and are in the same POC cycle as the current picture may be determined to be short-term reference pictures (or pictures marked as "used for short-term reference"), whereas the remaining pictures in list 0 and list 1 (which are in a different POC cycle as the current picture) are determined to be long-term reference pictures (or pictures marked as "used for long-term reference). The same marking is performed in the encoder and, based on the reference picture list descriptions included in the bitstream, also in the decoder. The marking as "used for long-term reference" may be used to control for example the motion vector scaling in temporal motion vector prediction for example in a temporal direct mode or the prediction weights in an implicit weighted prediction mode similarly to what is done in H.264/AVC. In some embodiments, a specific indication, such as a flag, for marking pictures as long-term reference pictures may be included in the reference picture list description syntax element, for example.

Figure 6A:
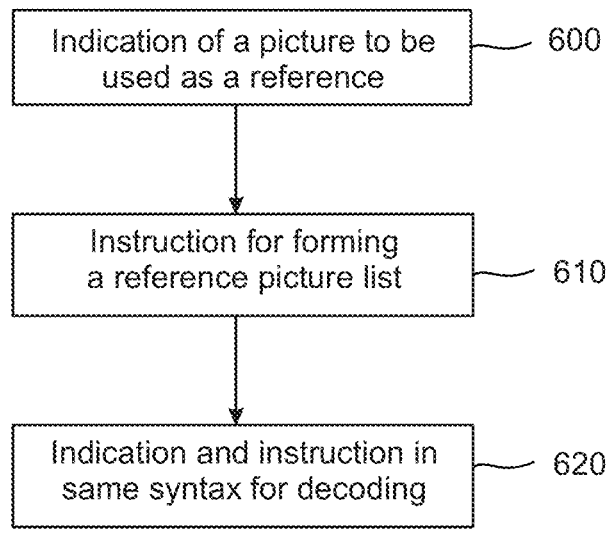
FIGS. 6a and 6b show flow charts of methods for handling reference pictures according to example embodiments.

FIG. 6a shows a flow chart of methods for handling reference pictures according to example embodiments.

At the encoder, and for the video coding signal to be generated, an indication of a picture to be used as a reference is provided at phase 600. This indication may comprise insertion of the reference picture to one of the reference picture lists (list 0 and list 1 for the current picture or idle list for other pictures). A separate marking syntax or element in the signal may not be needed, since the existence of a picture on the list may be sufficient for it not to be discarded too early.

At phase 610, which may take place before or after phase 600 or simultaneously, an instruction for forming a reference picture list may be provided. The instruction may comprise data specifying e.g. one or more ordered or unordered reference picture lists. In other words, pictures to be put in the lists are identified, e.g. with a picture order count POC identifier.

At phase 620 which may take place before or after the previously described phases or simultaneously, the indication and instruction are provided in a single syntax. This may happen by e.g. providing an ordered list of reference pictures to be put in one or more lists, whereby other pictures can be determined as not to be used as reference in the decoding of current or later pictures.

At the decoder, and for the video coding signal to be decoded, an indication of a picture to be used as a reference is decoded from a bitstream at phase 600. This indication may comprise insertion of the reference picture to one of the reference picture lists (list 0 and list 1 for the current picture or idle list for other pictures). A separate marking syntax or element in the signal may not be needed, since the existence of a picture on the list may be sufficient for it not to be discarded too early. The decoder may use this indication for maintaining reference picture memory, as described earlier.

At phase 610, which may take place before or after phase 600 or simultaneously, an instruction for forming a reference picture list may be decoded from a bitstream (typically the same bitstream as above). The instruction may comprise data specifying e.g. one or more ordered or unordered reference picture lists. In other words, pictures to be put in the lists are identified, e.g. with a picture order count POC identifier.

At phase 620 which may take place before or after the previously described phases or simultaneously, the indication and instruction are decoded from a single syntax. This may happen by e.g. decoding an ordered list of reference picture identifiers to be put in one or more lists, whereby other pictures can be determined as not to be used as reference in the decoding of current or later pictures.

Figure 6B:
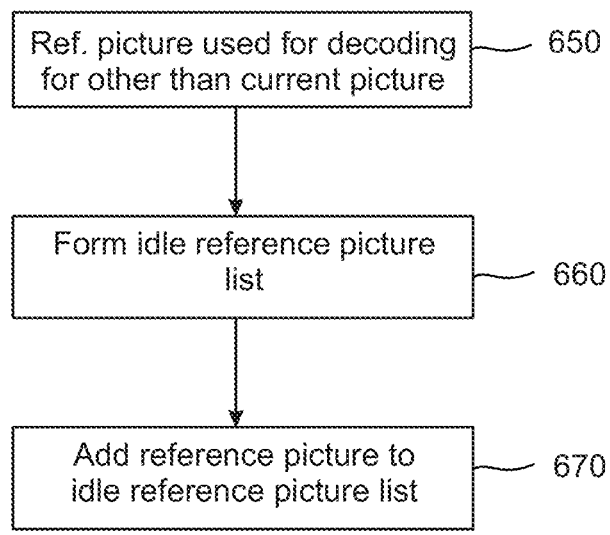

FIG. 6b shows a flow chart of methods for handling reference pictures according to example embodiments.

Together or independently from the above, at the encoder or for the video data signal to be generated, reference pictures to be used for decoding of other pictures than the current picture may be handled as follows.

In phase 650, at least one reference picture to be used for decoding of other pictures than the current picture may be identified. In phase 660, a so-called idle reference picture list or idle list may be formed. In phase 670, the identified picture(s) may be inserted into the list and a signal may be generated describing the structure and contents of the idle list. Through this process, separate marking of pictures to be used for reference may not be needed, since the existence of a picture on the idle list may communicate to the decoder that the picture cannot be discarded because it will be used later as a reference picture for decoding of other pictures than the current picture.

Together or independently from the above, at the decoder or for the video data signal to be decoded, reference pictures to be used for decoding of other pictures than the current picture may be handled as follows.

In phase 650, at least one reference picture identifier to be used for decoding of other pictures than the current picture may be decoded from a video data signal. In phase 660, a so-called idle reference picture list or idle list may be decoded from the video data signal. In phase 670, the decoded picture identifier(s) may be inserted into the list. The order of decoding may vary, that is the phases 650, 660 and 670 may be carried out in a different order. Through this process, separate marking and tracking of pictures to be used for reference may not be needed, since the existence of a picture on the idle list may communicate to the decoder that the picture cannot be discarded because it will be used later as a reference picture for decoding of other pictures than the current picture.

Figure 7:
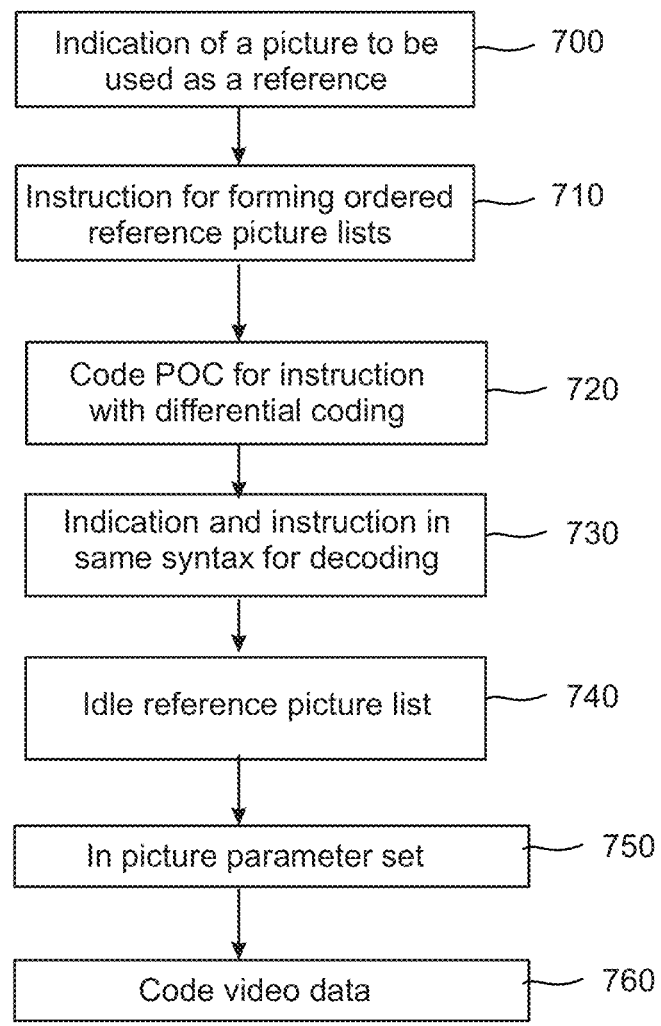
FIG. 7 shows a flow chart of methods for handling reference pictures according to example embodiments.

FIG. 7 shows a flow chart of a method for handling reference pictures according to an example embodiment.

At the encoder, and for the video coding signal to be generated, an indication if a picture is to be used as a reference is provided at phase 700. This indication, if indicating a reference picture, may incur insertion of the reference picture to one of the reference picture lists (list 0 and list 1 for the current picture or idle list for other pictures). A separate marking syntax or element in the signal may not be needed, since the existence of a picture on the list may be sufficient for it not to be discarded too early. In other words, phase 700 generates the nal_ref_idc for the current picture indicating if the current picture is a reference picture (nal_ref_idc==1) or non-reference picture (nal_ref_idc==0).

Block 700 may be performed for every picture, while phases 710-750 may be performed for P and B pictures/slices. Reference picture lists themselves may be formed for each P and B picture separately even though the ref_pic_lists( ) syntax structure only needs to be created if it changes (e.g. the differentially coded POC values change).

Block 700 may take place before or after any of the phases 710-760 or simultaneously. Reference picture marking of the current picture may happen after its encoding or decoding.

At phase 710, an instruction for forming a reference picture list may be provided into the bitstream. The instruction may comprise data specifying e.g. one or more ordered or unordered reference picture lists. In other words, pictures to be put in the lists are identified, e.g. with a picture order count POC identifier. For example, the instruction may provide information on three reference picture lists, two for decoding the current picture (list 0 and list 1) and one idle reference picture list. The lists may be ordered lists.

At phase 720, the POC identifiers may be encoded with differential coding to improve compression efficiency. A granularity of the coding and a baseline POC value may be provided, and the difference from the POC base value may be encoded, that is, differential encoding of picture order count POC may be carried out.

At phase 730 which may take place before or after the previously described phases or simultaneously, the indication and instruction are encoded in a single syntax. This may happen by e.g. encoding an ordered list of reference picture identifiers to be put in one or more reference picture lists, whereby other pictures can be determined as not to be used as reference in the decoding of current or later pictures.

Together or independently from the above, at the encoder or for the video data signal to be generated, reference pictures to be used for decoding of other pictures than the current picture may be handled as follows.

In phase 740, at least one reference picture to be used for decoding of other pictures than the current picture may be identified. A so-called idle reference picture list or idle list may be formed. The identified picture(s) may be inserted into the list and a signal may be generated describing the structure and contents of the idle list. Through this process, separate marking of pictures to be used for reference may not be needed, since the existence of a picture on the idle list may communicate to the decoder that the picture cannot be discarded because it will be used later as a reference picture for decoding of other pictures than the current picture.

In phase 750, the reference picture lists may be provided in a picture parameter set PPS or in a slice header. Including the reference picture lists ref_pic_lists( ) syntax structure in a picture parameter set PPS may be beneficial for regular group of pictures GOP and/or prediction structures, for example. In other words, the described reference picture marking and/or reference picture list handling structure may be formed into and transmitted in a picture parameter set or another structure that can be used for more than one picture slice and/or for more than one picture. In the case the structure of a group of pictures (GOP) remaining the same or essentially the same, the reference picture list description (marking and list management) may remain essentially the same for a plurality of slices, a plurality of pictures and even for a plurality of groups of pictures (GOP).

In phase 760, video data is encoded using the encoder described earlier or another encoder. An advantage of the example embodiments described herein is that if the encoding structure stays the same, information on the reference pictures may not need to be re-transmitted to the decoder e.g. due to the differential encoding of the picture identifiers (POC values).

At the decoder, and for the video coding signal to be decoded, an indication if a picture is to be used as a reference is decoded at phase 700. This indication may comprise insertion of the reference picture to one of the reference picture lists (list 0 and list 1 for the current picture or idle list for other pictures). A separate marking syntax or element in the signal may not be needed, since the existence of a picture on the list may be sufficient for it not to be discarded too early.

Block 700 may take place before or after any of the phases 710-760 or simultaneously.

At phase 710, which may take place before or after phase 700 or simultaneously, an instruction for forming a reference picture list may be decoded from the bitstream. The instruction may comprise data specifying e.g. one or more ordered or unordered reference picture lists. In other words, pictures to be put in the lists are identified, e.g. with a picture order count POC identifier. For example, the instruction may provide information on three reference picture lists, two for decoding the current picture (list 0 and list 1) and one idle reference picture list. The lists may be ordered lists.

At phase 720, the differentially-coded POC identifiers may be decoded. A granularity of the coding and a baseline POC value may be provided, and the difference from the POC base value may be decoded, that is, differential decoding of picture order count POC may be carried out.

At phase 730 which may take place before or after the previously described phases or simultaneously, the indication and instruction are decoded from a single syntax. This may happen by e.g. decoding an ordered list of reference picture identifiers to be put in one or more reference picture lists, whereby other pictures can be determined as not to be used as reference in the decoding of current or later pictures.

Together or independently from the above, at the decoder or for the video data signal to be decoded, reference pictures to be used for decoding of other pictures than the current picture may be handled as follows.

In phase 740, at least one reference picture to be used for decoding of other pictures than the current picture may be identified by decoding from the bitstream. A so-called idle reference picture list or idle list may be formed. The identified picture identifier(s) may be inserted into the list as a signal may be decoded describing the structure and contents of the idle list. Through this process, separate marking of pictures to be used for reference may not be needed, since the existence of a picture on the idle list may communicate to the decoder that the picture cannot be discarded because it will be used later as a reference picture for decoding of other pictures than the current picture.

In phase 750 (in any order with reference to steps 700-740), the reference picture lists may be decoded from a picture parameter set PPS or from a slice header.

In phase 760, video data is decoded using the decoder described earlier or another decoder. New reference picture lists information may be received from the bitstream. An advantage of the example embodiments described herein is that if the encoding structure stays the same, information on the reference pictures may not need to be re-transmitted and re-decoded at the decoder e.g. due to the differential encoding of the picture identifiers (POC values).

Some examples of implementing features of above example embodiments are described next. In the tables, ue(v) indicates a variable-length encoded unsigned integer element and e.g. u(1) indicates a 1-bit fixed-length encoded unsigned integer element and u(v) indicates a fixed-length encoded unsigned integer element where the number of bits is determined by other syntax element values. Underlined elements have been added to the syntax according to example embodiments and stricken-over elements have been omitted.

A sequence parameter set syntax, encoding and decoding may be modified as shown in Table 1. Syntax elements related to frame numbers like the maximum frame number (log 2_max_framenum_minus4) and the flag indicating that gaps are allowed in frame numbering (gaps_in_frame_num_value_allowed_flag) may be removed. The granularity and maximum difference for picture order count in reference pictures for the current picture (poc_granularity_minus1 and max_shortterm_poc_diff_minus1) as well as for long-term reference pictures, that is, idle reference pictures (poc_granularity_idle_idx and max_poc_diff_idle_minus1) are given for each temporal layer.

TABLE 1

Sequence parameter set RBSP syntax

|  | Descriptor |
|---|---|
| seq_parameter_set_rbsp( ) { | |
| ... | ... |
| for( i = 0; i <= max_temporal_layers_minus1; i++ ) { | |
|   poc_granularity_minus1[ i ] | ue(v) |
|   max_shortterm_poc_diff_minus1[ i ] | ue(v) |
|   poc_granularity_idle_idx[ i ] | ue(v) |
|   max_poc_diff_idle_minus1[ i ] | ue(v) |
| } | |
| ... | ... |
| rbsp_trailing_bits( ) | |
| } | |

A picture parameter set syntax, encoding and decoding may be modified as shown in Table 2. The picture parameter set may be modified to include a flag indicating that picture order count is encoded in differential mode (poc_diff_mode_flag). If a flag (pps_ref_pic_lists_flag) indicates that reference picture lists are present in the picture parameter set, the reference picture lists syntax ref_pic_lists( ) is inserted. This syntax is described later.

TABLE 2

Picture parameter set RBSP syntax

|  | Descriptor |
|---|---|
| pic_parameter_set_rbsp( ) { | |
|   pic_parameter_set_id | ue(v) |
|   seq_parameter_set_id | ue(v) |
|   ... | ... |
|   poc_diff_mode_flag | u(1) |
|   pps_ref_pic_lists_flag | u(1) |
|   if( pps_ref_pic_lists_flag = = 1 ) | |
|     ref_pic_lists( ) | |
|   ... | ... |
| } | |

A slice header syntax, encoding and decoding may be modified as shown in Table 3. The slice header may be modified to omit frame number elements (frame_num). If only one picture order count POC type is used, there is no need to identify the type or use it in processing (pic_order_cnt_type), and the least significant bits of picture order count can be given directly (pic_order_cnt_lsb). If the picture parameter set contains the reference picture list structure, one is not needed in the slice header, otherwise (pps_ref_pic_lists_flag=0), the reference picture list structure ref_pic_lists( ) is present. The reference picture list modification element ref_pic_lists_modification( ) and the decoded reference picture marking dec_ref_pic_marking( ) element may be omitted from the slice header. Also, their exact implementation is not needed in the syntax and the corresponding syntax definition can be removed.

TABLE 3

Slice header syntax

|  | Descriptor |
|---|---|
| slice_header( ) { | |
|   lightweight_slice_flag | u(1) |
|   if( !lightweight_slice_flag ) { | |
|     slice_type | ue(v) |
|     pic_parameter_set_id | ue(v) |

TABLE 3-continued

Slice header syntax

| | Descriptor |
|---|---|
|     if( IdrPicFlag ) | |
|       idr_pic_id | ue(v) |
|     pic_order_cnt_lsb | u(v) |
|     if( slice_type = = P \|\| slice_type = = B ) { | |
|       num_ref_idx_active_override_flag | u(1) |
|       if( num_ref_idx_active_override_flag ) { | |
|         num_ref_idx_l0_active_minus1 | ue(v) |
|         if( slice_type = = B ) | |
|           num_ref_idx_l1_active_minus1 | ue(v) |
|       } | |
|     } | |
|     if( pps_ref_pic_lists_flag = = 0 ) | |
|       ref_pic_lists( ) | |
|     ref_pic_list_combination( ) | |
|   } | |
|   ... | ... |
| } | |

A sequence parameter set RBSP semantics may be modified as follows.

A log 2_max_frame_num_minus4 specifying the value of the variable MaxFrameNum that is used in frame_num related derivations may be removed.

The following elements may be present to describe the encoding of picture order count with specific granularity and length of codeword in fixed-length coding.

poc_granularity_minus1[i]+1 specifies that the POC value interval of any two consecutive pictures in output order having temporal_id equal to or smaller than i shall be j*(poc_granularity_minus1[i]+1), where j is a positive integer. (poc_granularity_minus1[i]+1) shall be equal to k*(poc_granularity_minus1[i+1]+1), where k is a positive integer and i is greater than 0.

max_shortterm_poc_diff_minus1[i]+1 specifies the following constraint on the pictures in reference picture list 0 and reference picture list 1. Let picI be a picture having temporal_id equal to i and absPocDiff be the absolute difference of the POC value of picI and the POC value of any picture in reference picture list 0 and reference picture list 1 of picI in units of poc_granularity_minus1[i]+1. max_shortterm_poc_diff_minus1[i]+1 shall be greater than or equal to the value of absPocDiff for any picI having temporal_id equal to i.

poc_granularity_idle_idx[i] specifies the POC difference granularity for the reference picture list description of the idle reference picture list and for temporal_id equal to i.

max_poc_diff_idle_minus1[i] specifies the maximum absolute POC difference that uses fixed-length coding for in the reference picture list description of the idle reference picture list and for temporal_id equal to i.

delta_pic_order_always_zero_flag may be removed.

max_num_ref_frames specifies the maximum number of short-term and long-term reference frames, complementary reference field pairs, and non-paired reference fields that may be used by the decoding process for inter prediction of any picture in the sequence. The value of max_num_ref_frames shall be in the range of 0 to MaxDpbFrames, inclusive.

gaps_in_frame_num_value_allowed_flag may be removed.

A picture parameter set RBSP semantics may be modified as follows.

poc_diff_mode_flag equal to 0 specifies that all POC differences in the reference picture list description for reference picture list 0 and list 1 has the same sign. poc_diff_mode_flag equal to 1 specifies the sign is indicated for each POC difference in the reference picture list description for reference picture list 0 and list 1.

pps_ref_pic_lists_flag equal to 0 indicates that the ref_pic_lists( ) syntax structure is included in the slice header. pps_ref_pic_lists_flag equal to 1 indicates that ref_pic_lists( ) syntax structure is included in the picture parameter set and not included in the slice header.

Slice header semantics may be modified as follows.

lightweight_slice_flag equal to 1 specifies that the value of slice header syntax elements not present is inferred to be equal to the value of slice header syntax elements in a proceeding slice, where a proceeding slice is defined as the slice containing treeblock with location (LCUAddress−1). lightweight_slice_flag shall be equal to 0 when LCUAddress equal to 0.

slice_type specifies the coding type of the slice according to Table 4.

TABLE 4

Name association to slice_type

| slice_type | Name of slice_type |
|---|---|
| 0 | P (P slice) |
| 1 | B (B slice) |
| 2 | I (I slice) |

When nal_unit_type is equal to 5 (IDR picture), slice_type shall be equal to 2.

When max_num_ref_frames is equal to 0, slice_type shall be equal to 2.

pic_parameter_set_id specifies the picture parameter set in use. The value of pic_parameter_set_id shall be in the range of 0 to 255, inclusive.

Elements related to frame number identifiers such as frame_num and corresponding processes and variables such as PrevRefFrameNum may be removed.

idr_pic_id identifies an IDR picture. The values of idr_pic_id in all the slices of an IDR picture shall remain unchanged. When two consecutive access units in decoding order are both IDR access units, the value of idr_pic_id in the slices of the first such IDR access unit shall differ from the idr_pic_id in the second such IDR access unit. The value of idr_pic_id shall be in the range of 0 to 65535, inclusive.

pic_order_cnt_lsb specifies the picture order count modulo MaxPicOrderCntLsb for a coded frame. The length of the pic_order_cnt_lsb syntax element is log 2_max_pic_order_cnt_lsb_minus4+4 bits. The value of the pic_order_cnt_lsb shall be in the range of 0 to MaxPicOrderCntLsb−1, inclusive.

num_ref_idx_active_override_flag equal to 1 specifies that the syntax element num_ref_idx_l0_active_minus1 is present for P and B slices and that the syntax element num_ref_idx_l1_active_minus1 is present for B slices. num_ref_idx_active_override_flag equal to 0 specifies that the syntax elements num_ref_idx_l0_active_minus1 and num_ref_idx_l1_active_minus1 are not present.

When the current slice is a P or B slice and field_pic_flag is equal to 0 and the value of num_ref_idx_l0_default_active_minus1 in the picture parameter set exceeds 15, num_ref_idx_active_override_flag shall be equal to 1.

When the current slice is a B slice and field_pic_flag is equal to 0 and the value of num_ref_idx_l1_default_active_minus1 in the picture parameter set exceeds 15, num_ref_idx_active_override_flag shall be equal to 1.

num_ref_idx_l0_active_minus1 specifies the maximum reference index for reference picture list 0 that shall be used to decode the slice.
When the current slice is a P or B slice and num_ref_idx_l0_active_minus1 is not present, num_ref_idx_l0_active_minus1 shall be inferred to be equal to num_ref_idx_l0_default_active_minus1.

num_ref_idx_l1_active_minus1 specifies the maximum reference index for reference picture list 1 that shall be used to decode the slice.
When the current slice is a B slice and num_ref_idx_l1_active_minus1 is not present, num_ref_idx_l1_active_minus1 shall be inferred to be equal to num_ref_idx_l1_default_active_minus1.

Reference picture list modification semantics may be removed, since reference picture list modification is not needed if the reference picture list semantics are used according to example embodiments.

Similarly, decoded reference picture marking semantics may be removed, since reference picture marking is not needed if the reference picture list semantics are used according to example embodiments.

Reference picture list description syntax may be added as follows.

| | Descriptor |
|---|---|
| ref_pic_list_description( numRefPics, pocDiffModeFlag, maxPocDiff) { | |
|   if( numRefPics > 0) { | |
|     for( i = 0; i < numRefPics; i++) { | |
|       if( pocDiffModeFlag = = 1 ) | |
|         poc_diff_sign[ i ] | u(1) |
|       if( maxPocDiff > 1 ) | |
|         poc_diff_param[ i ] | u(v) |
|     } | |
|     num_longterm_pics | ue(v) |
|     for( j = 0; j < num_longterm_pics; j++ ) { | |
|       abs_diff_ref_pic_idx | ue(v) |
|       abs_diff_poc_cycle_minus1 | ue(v) |
|     } | |
|   } | |
| } | |

Reference picture list description semantics may be added as follows.

poc_diff_sign[i] specifies the sign of the POC difference used in the reference picture list description process.

poc_diff_param[i] specifies an absolute POC difference used in the reference picture list description process. poc_diff_param[i] is represented by Ceil(Log 2(maxPocDiff)) bits.

Function Ceil(x) is defined to return the smallest integer greater than or equal to x. Function Log 2(x) is defined to return the base-2 logarithm of x.

num_longterm_pics specifies the number of reference pictures in the reference picture list that are marked as "used for long-term reference".

abs_diff_ref_pic_idx specifies an absolute difference compared to a reference index prediction value.

abs_diff_poc_cycle_minus1 specifies an absolute POC difference used in the reference picture list description process.

Reference picture lists syntax may be added as follows.

| | Descriptor |
|---|---|
| ref_pic_lists( ) { | |
|   if( decoding a slice header ) { | |
|     if( slice_type % 5 != 2) { | |
|       num_ref_pics_l0_minus1 | ue(v) |
|       ref_pic_list_description( | |
|         num_ref_pics_l0_minus1 + 1, | |
|         poc_diff_mode_flag, | |
|         max_shortterm_poc_diff_minus1[ temporal_id ] + 1) // for l0 | |
|     } | |
|     if( slice_type % 5 = = 1 ) { | |
|       num_ref_pics_l1_minus1 | ue(v) |
|       ref_pic_list_description( | |
|         num_ref_pics_l1_minus1 + 1, | |
|         poc_diff_mode_flag, | |
|         max_shortterm_poc_diff_minus1[ temporal_id ] + 1 ) // for l1 | |
|       ref_pic_list_copy_flag | u(1) |
|     } | |
|     num_ref_pics_idle | ue(v) |
|     if( num_ref_pics_idle > 0) { | |
|       poc_diff_mode_idle | u(1) |
|       ref_pic_list_description( | |
|         num_ref_pics_idle, | |
|         poc_diff_mode_idle, | |
|         max_poc_diff_idle_minus1[ temporal_id ] + 1 ) // for idle list | |
|     } | |
|   } else{ // decoding a picture parameter set | |
|     num_ref_pics_l0_minus1 | ue(v) |
|     ref_pic_list_description( | |
|       num_ref_pics_l0_minus1 + 1, | |
|       poc_diff_mode_flag, | |
|       MaxPicOrderCntLsb / 2 ) // for l0 | |
|     } | |
|     num_ref_pics_l1_minus1 | ue(v) |
|     ref_pic_list_description( | |
|       num_ref_pics_l1_minus1 + 1, | |
|       poc_diff_mode_flag, | |
|       MaxPicOrderCntLsb / 2 ) // for l1 | |
|     ref_pic_list_copy_flag | u(1) |
|     num_ref_pics_idle | ue(v) |
|     if( num_ref_pics_idle > 0 ) { | |
|       poc_diff_mode_idle | u(1) |
|       ref_pic_list_description( | |
|         num_ref_pics_idle, | |
|         poc_diff_mode_idle, | |
|         MaxPicOrderCntLsb / 2 ) // for idle list | |
|     } | |
|   } | |
| } | |

Reference picture lists semantics may be added as follows.

The syntax structure may contain up to three reference picture list description syntax structures, where the first one is for the initial reference picture list 0 and is present for P and B slices, the second one is for the initial reference picture list 1 and is present for B slices, and the third one is for the idle reference picture list and is present if num_ref_pics_idle is greater than 0.

num_ref_pics_l0_minus1+1 specifies the number of reference pictures in reference picture list 0 for the reference picture list description process.

num_ref_pics_l1_minus1+1 specifies the number of reference pictures in reference picture list 1 for the reference picture list description process.

ref_pic_list_copy_flag equal to 1 specifies that the initial reference picture list 0 is appended by the reference pictures in the reference picture list description for the initial reference picture list 1 and that the initial reference picture list 1 is appended by the reference pictures in the reference picture list description for the initial reference picture list 0.

num_ref_pics_idle specifies the number of reference pictures in the idle reference picture list.

poc_diff_mode_idle specifies whether signed or unsigned differences are provided for the idle reference picture list in the reference picture list description process.

A reference picture lists combination semantics may be as follows.

ref_pic_list_combination_flag equal to 1 indicates that the reference picture list 0 and the reference picture list 1 are combined to be an additional reference picture lists combination used for the prediction units being uni-directional predicted. This flag equal to 0 indicates that the reference picture list 0 and reference picture list 1 are identical thus reference picture list 0 is used as the reference picture lists combination. The reference picture lists combination is set to be empty at the start of the loop defined in this table.

num_ref_idx_lc_active_minus1+1 specifies the number of reference pictures selected from reference picture list 0 or reference picture list 1 in the reference picture lists combination.

ref_pic_list_modification_flag_lc equal to 1 specifies that the syntax element pic_from_list_0_flag and ref_idx_list_curr are present for specifying the mapping for the entries of the reference picture lists combination to the entries of reference picture list 0 and reference picture list 1.

ref_pic_list_modification_flag_lc equal to 0 specifies that these syntax elements are not present. The reference picture lists combination is initialized.

pic_from_list_0_flag indicates the current reference picture added into the reference picture lists combination is from reference picture list 0 or reference picture list 1. When this flag is equal to 1, the picture is from the reference picture list 0, and the CurrRefPicList is reference picture list 0; when this flag is equal to 0, the picture is from the reference picture list 1, and the CurrRefPicList is reference picture list 1;

ref_idx_list_curr indicates the reference index of the picture in the CurrRefPicList to be appended at the end of the reference picture lists combination.

Decoding process for picture order count (POC) may be simplified as follows.

For example, TopFieldOrderCnt and BottomFieldOrderCnt for field identification may be removed and the process simplified correspondingly to comprise only one picture order count. For example, only one picture order count type may be used.

Output of this process is PicOrderCnt.

Picture order counts are used to determine initial picture orderings for reference pictures in the decoding of B slices, to determine co-located pictures for deriving motion parameters in temporal or spatial direct mode, for implicit mode weighted prediction in B slices, and for decoder conformance checking.

Picture order count information PicOrderCnt is derived for every frame.

PicOrderCnt indicates the picture order of the corresponding frame relative to the previous IDR picture.

The bitstream shall not contain data that result in values of PicOrderCnt or PicOrderCntMsb used in the decoding process as specified below that exceed the range of values from $-2^{31}$ to $2^{31}-1$, inclusive.

The function PicOrderCnt(picX) is specified as follows:
PicOrderCnt(picX)=PicOrderCnt of the frame picX Then DiffPicOrderCnt(picA, picB) is specified as follows:
DiffPicOrderCnt(picA, picB)=PicOrderCnt(picA)−PicOrderCnt(picB)

The bitstream shall not contain data that result in values of DiffPicOrderCnt(picA, picB) used in the decoding process that exceed the range of $-2^{15}$ to $2^{15}-1$, inclusive.

The variables prevPicOrderCntMsb and prevPicOrderCntLsb are derived as follows.

If the current picture is an IDR picture, prevPicOrderCntMsb is set equal to 0 and prevPicOrderCntLsb is set equal to 0.

Otherwise (the current picture is not an IDR picture), prevPicOrderCntMsb is set equal to PicOrderCntMsb of the previous reference picture in decoding order and prevPicOrderCntLsb is set equal to the value of pic_order_cnt_lsb of the previous reference picture in decoding order.

PicOrderCntMsb of the current picture is derived as specified by the following pseudo-code:

if((pic_order_cnt_lsb<prevPicOrderCntLsb) &&
((prevPicOrderCntLsb−pic_order_cnt_lsb)>=(MaxPicOrderCntLsb/2)))
PicOrderCntMsb=prevPicOrderCntMsb+MaxPicOrderCntLsb
else if((pic_order_cnt_lsb>prevPicOrderCntLsb) &&
((pic_order_cnt_lsb−prevPicOrderCntLsb)>(MaxPicOrderCntLsb/2)))
PicOrderCntMsb=prevPicOrderCntMsb−MaxPicOrderCntLsb
else
PicOrderCntMsb=prevPicOrderCntMsb.

PicOrderCnt is derived as follows
PicOrderCnt=PicOrderCntMsb+pic_order_cnt_lsb.

In some embodiments, POC may be coded in the slice header by other means than using pic_order_cnt_lsb as presented above. For example, any other POC type specified in H.264/AVC may be used and the respective syntax elements may be present.

In some embodiments, POC may be coded in the slice header as follows instead of using pic_order_cnt_lsb or any other POC type in H.264/AVC. The slice header may include a syntax element poc_lsb_for_temporal_id, which is of type u(v). The number of bits in poc_lsb_for_temporal_id is determined using the POC cycle at temporal_id equal to 0, here denoted pocCycleTid0, which may be equal or proportional to (max_shortterm_poc_diff_minus1[0]+1)*(poc_granularity_minus1[0]+1) or may be indicated by another syntax element(s). The number of POC quantization steps per POC cycle is then determined for each temporal_id by pocStepsPerCycle[i]=pocCycleTid0/(poc_granularity_minus1[i]+1). The number of bits in poc_lsb_for_temporal_id is then determined by Ceil(Log 2(pocStepsPerCycle[temporal_id])).

Decoding process for unified reference picture lists construction and reference picture marking may be as follows.

For example, the process for marking pictures for short-term reference and long-term reference may be omitted. For example, the reference picture list modification processes may be omitted.

This process is invoked at the beginning of the decoding process for each P, B, or I slice.

Reference pictures are addressed through reference indices. A reference index is an index into a reference picture list. When decoding a P slice, there is a single reference picture list RefPicList0. When decoding a B slice, there is a second independent reference picture list RefPicList1 in addition to RefPicList0. In addition, there is an idle reference picture list RefPicListIdle, which may contain zero or more reference pictures that are not used as reference for the current picture but may be used for reference in subsequent pictures in decoding order.

Each reference picture in the reference picture lists RefPicList0, RefPicList1, and RefPicListIdle as associated with the variable RefPicPoc[lX, refIdx], where lX is one of l0, l1, or lIdle and refIdx is the reference index within the reference picture list. The derivation of RefPicPoc[lX, refIdx] is specified below.

At the beginning of the decoding process for each slice, the reference picture lists are derived as specified e.g. by the following steps:
1. RefPicList0, RefPicList1, and RefPicListIdle are initially empty.
2. For P and B slices, the reference picture list RefPicList0 is initialised through the reference picture list description process with RefPicList0 and pocGranularity equal to (poc_granularity_minus1[temporal_id]+1) as input.
3. For B slices, the reference picture list RefPicList1 is initialised through the reference picture list description process with RefPicList1 and pocGranularity equal to (poc_granularity_minus1[temporal_id]+1) as input.
4. If the current slice is a B slice and ref_pic_list_copy_flag is equal to 1, RefPicList0 is copied to tempRefPicList0 and RefPicList1 is copied to tempRefPicList1. Then, RefPicList0 is reset to contain a concatenation of tempRefPicList0 and tempRefPicList1, and RefPicList1 is reset to contain a concatenation of tempRefPicList1 and tempRefPicList0.
5. pocGranularity for the idle reference picture list is set equal to poc_granularity_minus1[temporal_id-poc_granularity_idle_idx[temporal_id]]+1. Then, RefPicListIdle is specified through reference picture list description process with RefPicListIdle and the derived pocGranularity as input.
6. Any picture that is in no one of the idle reference picture list, reference picture list RefPicList0, and for B slices RefPicList1 is marked as "unused for reference".
7. The number of entries in the reference picture list RefPicList0 is set to num_ref_idx_l0_active_minus1+1, and for B slices the number of entries in the reference picture list RefPicList1 is set to num_ref_idx_l1_active_minus1+1.

A reference picture may appear at more than one index in the reference picture lists RefPicList0 or RefPicList1.

Reference picture list description process may be as follows.

For example, decoding process for frame number based picture numbers may be omitted.

Input to reference picture list description process is a ref_pic_list_description( ) structure, variables numRefPics, pocDiffModeFlag, maxPocDiff, and pocGranularity, and the reference picture list refPicListX (RefPicList0, RefPicList1, or RefPicListIdle) which is described.

Output of this process is the reference picture list RefPicList0, RefPicList1, or RefPicListIdle. That is, two reference picture lists RefPicList0 and RefPicList1 for decoding the current picture and an idle reference picture list RefPicListIdle for decoding later pictures.

If the number of reference pictures numRefPics is greater than 0, the following steps are performed for loop entries i:
The variable pocDiffSign[i] is specified as follows:
If poc_diff_sign[i] is present, the variable pocDiffSign[i] is set equal to poc_diff_sign[i].
Otherwise, if the input to this process is RefPicList0 or RefPicListIdle, pocDiffSign[i] is set equal to 0.
Otherwise (the input to this process is RefPicList1), pocDiffSign[i] is set equal to 1.
If poc_diff_param[i] is present, the variable absPocDiff is set equal to poc_diff_param[i]+1.
Otherwise, the variable absPocDiff is set equal to 1.
The variable refPicPoc[refPicListX, i] is specified by the following pseudo-code:
  if(pocDiffSign[i]==0)
    refPicPoc[refPicListX, i]=
      PicOrderCnt−absPocDiff*pocGranularity
  else
    refPicPoc[refPicListX, i]=
      PicOrderCnt+absPocDiff*pocGranularity
The variable currRefIdx is set equal to 0.
For each loop entry j, the following ordered steps are performed:
  currRefIdx+=abs_diff_ref_pic_idx[j]
The variable refPicPoc[refPicListX, currRefIdx] is updated by the following pseudo-code:
  if(pocDiffSign[currRefIdx]==0)
    refPicPoc[refPicListX, currRefIdx]−=(abs_diff_poc_cycle_minus1+1)*maxPocDiff*pocGranularity
  else
    refPicPoc[refPicListX, currRefIdx]+=(abs_diff_poc_cycle_minus1+1)*maxPocDiff*pocGranularity
The picture with loop entry currRefIdx is marked as "used for long-term reference".
All pictures in RefPicListX that are not marked as "used for long-term reference" are marked as "used for short-term reference".

A mapping process for reference picture lists combination in B slices may be as follows.

For example, an initialization process for reference picture lists for P slices may be omitted.

This mapping process is invoked when decoding a B slice header.

Input to this process are the reference picture list RefPicListX and num_ref_idx_lX_active_minus1 with X being 0 or 1. That is, two reference picture lists may be used for decoding the B slice.

Outputs of this process are arrays PredLCToPredLx and RefIdxLCToRefIdxLx.

When the current slice is a B slice and ref_pic_list_modification_flag_lc is equal to 0, the following steps apply:
1. Let refIdxL0 and refIdxL1 be indices into the reference picture lists RefPicListL0 and RefPicListL1. They are initially set equal to 0.
2. Let refIdxLC be an index into PredLCToPredLx and RefIdxLCToRefIdxLx. It is initially set equal to 0.
3. The following process is repeated until refIdxL0 and refIdxL1 are both greater than num_ref_idx_l0_active_minus1 and num_ref_idx_l1_active_minus1, respectively:
   If refIdxL0 is less than or equal to num_ref_idx_l0_active_minus1,
     If the entry RefPicListL0[refIdxL0] is the first occurrence of the reference picture,
       PredLCToPredLx[refIdxLC]=Pred_L0,
       RefIdxLCToRefIdxLx[refIdxLC++]=refIdxL0.
     refIdxL0++.
   If refIdxL1 is less than or equal to num_ref_idx_l1_active_minus1 and ref_pic_list_combination_flag equal to 1, If the entry RefPicListL1[refIdxL1] is the first occurrence of the reference picture,
PredLCToPredLx[refIdxLC]=Pred_L1,
RefIdxLCToRefIdxLx[refIdxLC++]=refIdxL1.
refIdxL1++.

When the current slice is a B slice and ref_pic_list_modification_flag_lc is equal to 1, the following steps apply:
1. Let refIdxLC be an index into the reference picture list PredLCToPredLx and RefIdxLCToRefIdxLx. It is initially set equal to 0.
2. The corresponding syntax elements pic_from_list_0_flag and ref_idx_list_curr are processed in the order they occur in the bitstream. For each of these syntax elements pairs, the following applies.
   If pic_from_list_0_flag is equal to 1,
   PredLCToPredLx[refIdxLC]=Pred_L0,
   Otherwise,
   PredLCToPredLx[refIdxLC]=Pred_L1
   RefIdxLCToRefIdxLx[refIdxLC++]=ref_idx_list_curr When refIdxLC is greater than num_com_ref list_active_minus1+1, the extra entries past position num_com_ref_list_active_minus1 are discarded from PredLCToPredLx and RefIdxLCToRefIdxLx. When refIdxLC is less than num_com_ref_list_active_minus1+1, the remaining entries in PredLCToPredLx and RefIdxLCToRefIdxLx are set equal to Pred_L0 and 0, respectively.

A decoded reference picture marking process may be omitted, because the reference picture lists process already indicates which pictures are to be used for reference by having the reference picture on the lists.

In some embodiments, more than one reference picture list of the same type (e.g. of type reference picture list 0, reference picture list 1, the idle reference picture list) may be included in the ref_pic_lists( ) syntax structure and each reference picture list may be identified with an identifier or a reference list index. The reference list index may be explicitly provided in the syntax or a numbering rule based on the appearance order in the containing syntax structure may be used, such as giving the first reference picture list of a particular type reference list index 0 and incrementing the reference list index by 1 for each reference picture list of the same type in the appearance or bitstream order. The reference list index may be particularly helpful if the ref_pic_lists( ) structure resides in a picture parameter set PPS and a selection of the reference picture list description is made by included a reference list index in the slice header, for example. In some embodiments, reference picture list 0 and reference picture list 1 are considered to be of the same type and hence use the same numbering space for reference list indexes.

For example, in various embodiments the following reference picture list description syntax may be added.

| | Descriptor |
|---|---|
| ref_pic_list_description( idx, numRefPics, pocDiffModeFlag, maxPocDiff) { | |
|   if( numRefPics > 0) { | |
|     for( i = 0; i < numRefPics; i++ ) { | |
|       if( pocDiffModeFlag = = 1 ) | |
|         poc_diff_sign[ i ] | u(1) |
|       if( maxPocDiff > 1 ) | |
|         poc_diff_param[ i ] | u(v) |
|     } | |
|     num_longterm_pics | ue(v) |

-continued

| | Descriptor |
|---|---|
|     for( j = 0; j < num_longterm_pics; j++) { | |
|       abs_diff_ref_pic_idx | ue(v) |
|       abs_diff_poc_cycle_minus1 | ue(v) |
|     } | |
|   } | |
| } | |

In various embodiments, the following syntax for reference picture lists in picture parameter set may be added.

| | Descriptor |
|---|---|
| ref_pic_lists_pps( ) { | |
|   poc_diff_mode_flag | u(1) |
|   same_ref_pic_list_idx_flag | u(1) |
|   num_l0_lists | ue(v) |
|   for( i = 0; i < num_l0_lists; i++ ) { | |
|     num_ref_pics_l0_minus1 | ue(v) |
|     ref_pic_list_description( | |
|       i, | |
|       num_ref_pics_l0_minus1 + 1, | |
|       poc_diff_mode_flag, | |
|       MaxPicOrderCntLsb / 2 ) // for l0 | |
|   } | |
|   num_l1_lists | ue(v) |
|   for( i = 0; i < num_l1_lists; i++ ) { | |
|     num_ref_pics_l1_minus1 | ue(v) |
|     ref_pic_list_description( | |
|       i, | |
|       num_ref_pics_l1_minus1 + 1, | |
|       poc_diff_mode_flag, | |
|       MaxPicOrderCntLsb / 2 ) // for l1 | |
|     ref_pic_list_copy_flag | u(1) |
|   } | |
|   num_idle_lists | ue(v) |
|   for( i = 0; i < num_idle_lists; i++ ) { | |
|     num_ref_pics_idle | ue(v) |
|     if( num_ref_pics_idle > 0) { | |
|       poc_diff_mode_idle | u(1) |
|       ref_pic_list_description( | |
|         i, | |
|         num_ref_pics_idle, | |
|         poc_diff_mode_idle, | |
|         MaxPicOrderCntLsb / 2) // for idle list | |
|     } | |
|   } | |
| } | |

In various embodiments, the following syntax for reference picture lists in slice header may be added.

| | Descriptor |
|---|---|
| ref_pic_lists_in_slice_header( ) { | |
|   if( slice_type % 5 != 2) { | |
|     ref_pic_l0l1_in_pps_flag | u(1) |
|     if( ref_pic_l0l1_in_pps_flag = = 0 ) { | |
|       num_ref_pics_l0_minus1 | ue(v) |
|       ref_pic_list_description( | |
|         -1, | |
|         num_ref_pics_l0_minus1+ 1, | |
|         poc_diff_mode_flag, | |
|         max_shortterm_poc_diff_minus1[ temporal_id ] + 1 ) // for l0 | |
|     } else | |
|       ref_pic_l0_idx | ue(v) |
|   } | |

|  | Descriptor |
|---|---|
| if( slice_type % 5 = = 1 ) { | |
|   if( ref_pic_l0l1_in_pps_flag = = 0 ) { | |
|     num_ref_pics_l1_minus1 | ue(v) |
|     ref_pic_list_description( | |
|       −1, | |
|       num_ref_pics_l1_minus1 + 1, | |
|       poc_diff_mode_flag, | |
|       max_shortterm_poc_diff_minus1[ temporal_id ] + | |
|       1) // for l1 | |
|     ref_pic_list_copy_flag | u(1) |
|   } else { | |
|     if(same_ref_pic_list_idx_flag = = 0 ) | |
|       ref_pic_l1_idx | ue(v) |
|   } | |
| idle_ref_pic_list_in_pps_flag | u(1) |
| if( idle_ref_pic_list_in_pps_flag = = 0 ) { | |
|   num_ref_pics_idle | ue(v) |
|   if( num_ref_pics_idle > 0 ) { | |
|     poc_diff_mode_idle | u(1) |
|     ref_pic_list_description( | |
|       −1, | |
|       num_ref_pics_idle, | |
|       poc_diff_mode_idle, | |
|       max_poc_diff_idle_minus1[ temporal_id ] + 1) | |
|       // for idle list | |
|   } | |
| } else | |
|   idle_ref_pic_list_idx | ue(v) |
| } | |

In various embodiments, the following semantics for reference picture lists in picture parameter set may be added.

The syntax structure may contain reference picture list description syntax structures for reference picture list 0, reference picture list 1 and the idle reference picture list.

poc_diff_mode_flag equal to 0 specifies that the default sign is used for POC differences indicated in the reference picture list description syntax for reference picture list 0 and 1. poc_diff_mode_flag equal to 1 specifies that the sign for each POC difference indicated in the reference picture list description syntax for reference picture list 0 and 1 is included in the reference picture list description syntax structure.

same_ref_pic_list_idx_flag equal to 1 indicates that a single reference picture list index, if any, is included in a slice header to identify which reference picture list description structure provided in this syntax structure is used to construct reference picture list 0 and reference picture list 1, if present. same_ref_pic_list_idx_flag equal to 0 indicates separate reference picture list indexes, if any, for reference picture list 0 and reference picture list 1 are included in a slice header to identify which reference picture list description structure provided in this syntax structure is used to construct reference picture list 0 and reference picture list 1, if present.

num_l0_lists indicates the number of reference picture list description structures for reference picture list 0.

num_ref_pics_l0_minus1+1 specifies the number of reference pictures in reference picture list 0 for the reference picture list description process.

num_l1_lists indicates the number of reference picture list description structures for reference picture list 1.

num_ref_pics_l1_minus1+1 specifies the number of reference pictures in reference picture list 1 for the reference picture list description process.

ref_pic_list_copy_flag equal to 1 specifies that the initial reference picture list 0 is appended by the reference pictures in the reference picture list description for the initial reference picture list 1 and that the initial reference picture list 1 is appended by the reference pictures in the reference picture list description for the initial reference picture list 0.

num_idle_lists indicates the number of reference picture list description structures for the idle reference picture lists.

num_ref_pics_idle specifies the number of reference pictures in the idle reference picture list.

poc_diff_mode_idle specifies whether signed or unsigned differences are provided for the idle reference picture list in the reference picture list description process.

In various embodiments, the following semantics for reference picture lists in slice header may be added.

The syntax structure may contain up to three reference picture list description syntax structures, where the first one is for the initial reference picture list 0 and is present for P and B slices, the second one is for the initial reference picture list 1 and is present for B slices, and the third one is for the idle reference picture list and is present if num_ref_pics_idle is greater than 0. Any one of the three reference picture list description syntax structures may also be indicated by a reference picture list index to a reference picture list description syntax structure included in the active picture parameter set.

ref_pic_l0l1_in_pps_flag equal to 0 indicates that the reference picture list description syntax structure is present for reference picture list 0 and, for B slices, reference picture list 1. ref_pic_l0l1_in_pps_flag equal to 1 indicates that the reference picture list index is provided for reference picture list 0 and, for B slices, reference picture list 1.

num_ref_pics_l0_minus1+1 specifies the number of reference pictures in reference picture list 0 for the reference picture list description process.

ref_pic_l0_idx indicates the reference picture list index for reference picture list description syntax structures specified for reference picture list 0 in the active picture parameter set.

num_ref_pics_l1_minus1+1 specifies the number of reference pictures in reference picture list 1 for the reference picture list description process.

ref_pic_list_copy_flag equal to 1 specifies that the initial reference picture list 0 is appended by the reference pictures in the reference picture list description for the initial reference picture list 1 and that the initial reference picture list 1 is appended by the reference pictures in the reference picture list description for the initial reference picture list 0.

ref_pic_l1_idx indicates the reference picture list index for reference picture list description syntax structures specified for reference picture list 1 in the active picture parameter set. If same_ref_pic_list_idx_flag is equal to 1, ref_pic_l1_idx is inferred to be equal to ref_pic_l0_idx.

idle_ref_pic_list_in_pps_flag equal to 0 indicates that the reference picture list description syntax structure is present for the idle reference picture list. idle_ref_pic_list_in_pps_flag equal to 1 indicates that the reference picture list index is provided for the idle reference picture list.

num_ref_pics_idle specifies the number of reference pictures in the idle reference picture list.

poc_diff_mode_idle specifies whether signed or unsigned differences are provided for the idle reference picture list in the reference picture list description process.

idle_ref_pic_list_idx indicates the reference picture list index for reference picture list description syntax structures specified for idle reference picture lists in the active picture parameter set.

In various embodiments, a decoding process for reference picture list description is specified as follows.

Input to this process is a ref_pic_list_description( ) structure, variables idx, numRefPics, pocDiffModeFlag, maxPocDiff, and pocGranularity, and the reference picture list refPicListX (RefPicList0, RefPicList1, or RefPicListIdle) which is described.

Output of this process is the reference picture list RefPicList0, RefPicList1, or RefPicListIdle having the specified reference picture list index idx.

If idx is −1, the reference picture list description is given in a slice header and is valid for the decoding of the respective slice. If idx is greater than or equal to 0, the reference picture list description is given in a picture parameter set and is decoded when a slice header contains an index referring to it.

If numRefPics is greater than 0, the following ordered steps are performed for each loop entry i:

The variable pocDiffSign[i] is specified as follows:
If poc_diff_sign[i] is present, the variable pocDiffSign[i] is set equal to poc_diff_sign[i].
Otherwise, if the input to this process is RefPicList0 or RefPicListIdle, pocDiffSign[i] is set equal to 0.
Otherwise (the input to this process is RefPicList1), pocDiffSign[i] is set equal to 1.

If poc_diff_param[i] is present, the variable absPocDiff is set equal to poc_diff_param[i]+1.
Otherwise, the variable absPocDiff is set equal to 1.
The variable refPicPoc[refPicListX, i] is specified by the following pseudo-code:
if(pocDiffSign[i]==0)
    refPicPoc[refPicListX, i]=
        PicOrderCnt−absPocDiff*pocGranularity
else
    refPicPoc[refPicListX, i]=
        PicOrderCnt+absPocDiff*pocGranularity
The variable currRefIdx is set equal to 0.
For each loop entry j, the following ordered steps are performed:
    currRefIdx+=abs_diff_ref_pic_idx[j]
The variable refPicPoc[refPicListX, currRefIdx] is updated by the following pseudo-code:
if(pocDiffSign[currRefIdx]==0)
    refPicPoc[refPicListX, currRefIdx]−=
        (abs_diff_poc_cycle_minus1+1)
            *maxPocDiff*pocGranularity
else
    refPicPoc[refPicListX, currRefIdx]+=
        (abs_diff_poc_cycle_minus1+1)*
            maxPocDiff*pocGranularity
The picture with loop entry currRefIdx is marked as "used for long-term reference".

All pictures in RefPicListX that are not marked as "used for long-term reference" are marked as "used for short-term reference".

In some embodiments, a different coding for indicating the picture order count POC values in the reference picture list description may be used. For example, in some embodiments, a sequence parameter set SPS or a picture parameter set PPS may include a pattern or a list of POC differences. In the reference picture list description an index to this list can then be given to indicate the POC difference for a reference picture to be included in the described reference picture list. In another example, which may be alternative or complementary to the previous example, the differential coding of POC values in the reference picture list description is done relative to a POC prediction value instead of the POC of the current picture. The POC prediction value may be initialized first to the POC of the current picture at the beginning of the decoding process for reference picture list description. The POC prediction value may then be updated after decoding of each POC difference to the decoded POC value resulting by summing the POC difference and the POC prediction value. In another example, a particular reference picture list description in a picture parameter set PPS may be used as a predictor for POC values of the reference picture list description in the slice header. A POC value predictor for each reference index in a reference picture list is first obtained from a reference picture list description of an active PPS. An indirect POC value difference, included in the slice header, is then summed up to the POC value predictor and the result of the summation is the POC value of the reference picture included in the reference picture list. Multiple ways of deriving the POC value predictor may be possible. For example, when deriving the POC value for a reference picture at reference index i in the reference picture list, the POC value predictor may be obtained by applying the decoding process for reference picture list description to reference index i in the reference picture list description included in an active PPS. Multiple ways of deriving the indirect POC value difference may be possible. For example, a constant indirect POC value difference may be given for a reference picture list. In another example, an indirect POC value difference is coded for each reference index using the reference picture list description syntax.

In some embodiments, the picture order count POC values in the reference picture list description may be added with the following syntax:

|  | Descriptor |
| --- | --- |
| ref_pic_list_description( minRefPics ) { |  |
|   num_ref_pics_param | ue(v) |
|   numRefPics = minRefPics + num_ref_pics_param |  |
|   if( numRefPics > 0) { |  |
|     for( i = 0; i < numRefPics; i++ ) |  |
|       poc_lsb_param[ i ] | u(v) |
|     num_differing_msb_values | ue(v) |
|     for( j = 0; j < num_differing_msb_values; j++ ) { |  |
|       abs_diff_ref_pic_idx | ue(v) |
|       abs_diff_poc_msb_minus1 | ue(v) |
|     } |  |
|   } |  |
| } |  |

Reference picture list description semantics may be added as follows.

num_ref_pics_param together with an input minRefPics to the reference picture list description process specify the number of reference pictures in the reference picture list.

poc_lsb_param[i] together with temporal_id and poc_granularity_minus1 specify the LSB value of POC. poc_lsb_param[i] is represented by Ceil(Log 2(MaxPicOrderCntLsb÷(poc_granularity_minus1[i]+1)))) bits for reference picture list 0 and reference picture list 1 and by Ceil(Log 2(MaxPicOrderCntLsb)) bits for the idle reference picture list.

num_differing_msb_values specifies the number of reference pictures in the reference picture list that have a different MSB value for the POC than that of the current picture.

abs_diff_ref_pic_idx specifies an absolute difference compared to a reference index prediction value.

abs_diff_poc_msb_minus1 specifies an absolute difference of in the MSB value of POC compared to the that of the current picture.

In the various embodiments, the ref_pic_lists( ) syntax max be added as follows:

| | Descriptor |
|---|---|
| ref_pic_lists( ) { | |
|   if( slice_type % 5 != 2 ) { | |
|     ref_pic_list_description( 1 ) // for l0 | |
|   } | |
|   if( slice_type % 5 = = 1 ) { | |
|     ref_pic_list_description( 1 ) // for l1 | |
|     ref_pic_list_copy_flag | u(1) |
|   } | |
|   ref_pic_list_description( 0 ) // for idle reference picture list | |
| } | |

Semantics of ref_pic_lists( ) may be added as follows.

The syntax structure may contain up to three reference picture list description syntax structures, where the first one is for the initial reference picture list 0 and is present for P and B slices, the second one is for the initial reference picture list 1 and is present for B slices, and the third one is for the idle reference picture list and is always present.

ref_pic_list_copy_flag equal to 1 specifies that the initial reference picture list 0 is appended by the reference pictures in the reference picture list description for the initial reference picture list 1 and that the initial reference picture list 1 is appended by the reference pictures in the reference picture list description for the initial reference picture list 0.

A decoding process for reference picture lists construction and reference picture marking in various embodiments may be as follows.

Each reference picture in the reference picture lists RefPicList0, RefPicList1, and RefPicListIdle as associated with the variable RefPicPoc[lX, refIdx], where lX is one of l0, l1, or lIdle and refIdx is the reference index within the reference picture list. The derivation of RefPicPoc[lX, refIdx] is specified below.

At the beginning of the decoding process for each slice, the reference picture lists are derived as specified by the following ordered steps:

1. RefPictList0, RefPictList1, and RefPicListIdle are initially empty.
2. For P and B slices, the reference picture list RefPicList0 is initialised through the reference picture list description process with RefPicList0 as input.
3. For B slices, the reference picture list RefPicList1 is initialised through the reference picture list description process with RefPicList1 as input.
4. If the current slice is a B slice and ref_pic_list_copy_flag is equal to 1, RefPicList0 is copied to tempRefPicList0 and RefPicList1 is copied to tempRefPicList1. Then, RefPicList0 is reset to contain a concatenation of tempRefPicList0 and tempRefPicList1, and RefPicList1 is reset to contain a concatenation of tempRefPicList1 and tempRefPicList0.
5. RefPicListIdle is specified through reference picture list description process with RefPicListIdle as input.

The number of entries in the modified reference picture list RefPicList0 is num_ref_idx_l0_active_minus1+1, and for B slices the number of entries in the modified reference picture list RefPicList1 is num_ref_idx_l1_active_minus1+1. A reference picture may appear at more than one index in the modified reference picture lists RefPicList0 or RefPicList1.

A picture that is included in at least one of the idle reference picture list, reference picture list RefPicList0, and for B slices RefPicList1 is marked as "used for reference".

Any picture that is in no one of the idle reference picture list, reference picture list RefPicList0, and for B slices RefPicList1 is marked as "unused for reference".

Reference picture list description process may be as follows.

Input to this process is a ref_pic_list_description( ) structure and the reference picture list refPicListX (RefPicList0, RefPicList1, or RefPicListIdle) which is described.

The variable pocOffset is set to pic_order_cnt_lsb % (poc_granularity_minus1[temporal_id]+2). If the input is RefPicList0 or RefPicList1, the variable pocGranularity is set to poc_granularity_minus1[temporal_id]+1). If the input is RefPicListIdle, the variable pocGranularity is set to 1.

For each loop entry i, the following ordered steps are performed:
  The variable pocLsb[i] is set to pocOffset+poc_lsb_param[i]*pocGranularity
  The variable pocMsb[i] is set to PicOrderCntMsb
  The variable currRefIdx is set equal to 0.

For each loop entry j, the following ordered steps are performed:
  currRefIdx+=abs_diff_ref_pic_idx[j]
  The variable pocMsb[currRefIdx] is set to PicOrderCntMsb−(abs_diff_poc_msb_minus1+1)*MaxPicOrderCntLsb For each loop entry k from 0, inclusive, to the number of entries in the reference picture list, exclusive, refPicPoc[refPicListX, k] is set to pocMsb[k]+pocLsb[k].

In some embodiments, syntax elements num_ref_idx_l0_default_active_minus1 and num_ref_idx_l1_default_active_minus1 are not included in the picture parameter set syntax and syntax elements num_ref_idx_active_override_flag, num_ref_idx_l0_active_minus1, and num_ref_idx_l1_active_minus1 are not included in the slice header syntax. In these embodiments, the number of decoded list entries in the reference picture list syntax structure may be used to determine the number of active reference indexes.

In some embodiments, the described reference picture list 0 may include also reference pictures that are not referenced in the inter prediction process for P slices or for the forward direction of B slices. Such non-referenced reference pictures may be excluded from the final reference picture list 0 for example using the num_ref_idx_l0_default_active_minus1 syntax element to limit the number of reference pictures in list 0. However, these reference pictures are included in list 0 in order to be able to describe reference picture list 1 by listing reference indexes to list 0 only. In other words, rather than listing POC values or POC differences for reference pictures in list 1, reference picture list 1 is described by listing the reference indexes or reference index differences compared to a prediction value, where the reference indexes or reference index differences refer to list 0. The prediction value may be initialized for example to 0 or to num_ref_idx_l0_default_active_minus1+1 (i.e. the first index excluded from list 0). The prediction value may be updated to the resolved reference index after decoding of each reference index difference. In some embodiments, the merge list is described by indicating the POC values of the reference pictures included in it, and reference picture list 0 and list 1 are described through reference indexes to the merge list.

In some embodiments, the reference picture list description for reference picture list 0 may include a flag for each loop entry indicating whether the identified reference picture is included in list 0 or not. Similarly, the reference picture list description for reference picture list 1 may include a flag for each loop entry indicating whether the identified reference picture is included in list 1 or not. Reference pictures that are identified in one of the reference picture list description structure for reference picture list 0 or 1 but that are not included in either list 0 or 1 may be inferred to belong to the idle reference picture list.

In some embodiments, more than two inter prediction blocks are used for prediction of a current block in multi-hypothesis prediction. Consequently, there may be more than two reference picture lists (e.g. 0, 1, 2, . . . ) used to indicate inter prediction references, and the ref_pic_lists syntax structure may include each of these reference picture lists. Furthermore, a picture may be marked as "unused for reference" if it is included in none of the reference picture lists in the ref_pic_lists( ) syntax structure and may be marked as "used for reference" it is included in at least one reference picture list in the ref_pic_lists( ) syntax structure.

In some embodiments, the motion vector prediction may be realized at least in some inter coding modes in such a manner that no reference index is explicitly included in the bitstream. Instead, the encoder and the decoder may use the same method to select one or more pairs of reference pictures (marked as "used for reference") and respective motion vectors into a candidate list e.g. based on reference pictures and respective motion vectors selected in the adjacent blocks. The encoder may then select which pair from the candidate list is used and encode syntax element(s) into the bitstream that indicate the chosen pair. In these embodiments, reference picture list 0 and list 1 need not be ordered but the reference pictures available for P slices and so-called forward prediction direction of B slices can be indicated similarly to reference picture list 0 in an unordered reference picture set 0. Similarly, the encoder can include a description of reference picture set 1 in the bitstream. The candidate list for P slices and forward direction of B slices can include pairs where the reference picture is among those in reference picture set 0. Similarly, the candidate list for backward direction of B slices can include pairs where the reference picture is among those in reference picture set 1. Reference picture marking can be realized similarly to other embodiments, i.e. reference pictures that are in no reference picture set are marked as "unused for reference" and reference pictures which are in at least one reference picture set are marked as "used for reference".

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method for video coding, comprising:
providing an indication in a syntax element, said indication indicative of whether a picture is to be used as a reference picture in decoding or not,
providing an instruction in said syntax element, said instruction indicative of a reference picture list structure, said reference picture list comprising pictures to be used in decoding a current picture, and
providing an idle reference picture list instruction in said syntax element, said idle reference picture list instruction indicative of an idle reference picture list structure, wherein pictures in said idle reference picture list are not used as reference pictures in decoding of the current picture, but are to be used as reference pictures in decoding of another picture than the current picture, wherein the pictures in said idle reference picture list are different than the pictures in the reference picture list and are not included in the reference picture list, and wherein pictures that are not in said idle reference picture list and not in said reference picture list are marked as unused for reference for any other picture decoded after the current picture.

2. A method according to claim 1, further comprising:
providing at least one of said indication and said instruction in a picture parameter set for decoding, said picture parameter set being common to a number of picture slices to be decoded.

3. A method according to claim 1, comprising:
providing an identification of an algorithm to be used for adding and removing pictures from said idle reference picture list in case provision or transmission of said idle reference picture list can be at least partially omitted.

4. A method for decoding video data, comprising:
decoding from a bitstream an indication from a syntax element, said indication indicative of whether a picture is to be used as a reference picture in decoding or not,
decoding an instruction from said syntax element, said instruction indicative of a reference picture list structure, said reference picture list comprising pictures to be used in decoding a current picture,
decoding an idle reference picture list instruction in a syntax element, said idle reference picture list instruction indicative of an idle reference picture list structure, wherein pictures in said idle reference picture list are not used as reference pictures in decoding of the current picture, but are to be used as reference pictures in decoding of another picture than the current picture, wherein the pictures in said idle reference picture list are different than the pictures in the reference picture list and are not included in the reference picture list, and wherein pictures that are not in said idle reference picture list and not in said reference picture list are marked as unused for reference for any other picture decoded after the current picture, and
using said indication and said instruction in handling reference pictures in decoding of video data.

5. A method according to claim 4, comprising:
decoding from a bitstream an identification of an algorithm to be used for adding and removing pictures from said idle reference picture list in case provision or transmission of said idle reference picture has been at least partially omitted.

6. An apparatus comprising a processor, and memory including computer program code, the memory and the computer program code configured to, with the processor, cause the apparatus to perform at least the following:
provide an indication in a syntax element, said indication indicative of whether a picture is to be used as a reference picture in decoding or not;
provide an instruction in said syntax element, said instruction indicative of a reference picture list structure, said reference picture list comprising pictures to be used in decoding a current picture, and
provide an idle reference picture list instruction in said syntax element, said idle reference picture list instruction indicative of an idle reference picture list structure, wherein pictures in said idle reference picture list are not used as reference pictures in decoding of the current picture, but are to be used as reference pictures in decoding of another picture than the current picture, wherein the pictures in said idle reference picture list are different than the pictures in the reference picture list and are not included in the reference picture list, and wherein pictures that are not in said idle reference picture list and not in said reference picture list are marked as unused for reference for any other picture decoded after the current picture.

7. An apparatus according to claim 6, further comprising computer program code configured to, with the processor, cause the apparatus to perform at least the following:
provide at least one of said indication and said instruction in a picture parameter set for decoding, said picture parameter set being common to a number of picture slices to be decoded.

8. An apparatus according to claim 6, further comprising computer program code configured to, with the processor, cause the apparatus to perform at least the following:
provide an identification of an algorithm to be used for adding and removing pictures from said idle reference picture list in case provision or transmission of said idle reference picture list can be at least partially omitted.

9. An apparatus for decoding video data comprising a processor, and memory including computer program code, the memory and the computer program code configured to, with the processor, cause the apparatus to perform at least the following:
decode from a bitstream an indication from a syntax element, said indication indicative of whether a picture is to be used as a reference picture in decoding or not,
decode an instruction from said syntax element, said instruction indicative of a reference picture list structure, said reference picture list comprising pictures to be used in decoding a current picture,
decode an idle reference picture list instruction in a syntax element, said idle reference picture list instruction indicative of an idle reference picture list structure, wherein pictures in said idle reference picture list are not used as reference pictures in decoding of the current picture, but are to be used as reference pictures in decoding of another picture than the current picture, wherein the pictures in said idle reference picture list are different than the pictures in the reference picture list and are not included in the reference picture list, and wherein pictures that are not in said idle reference picture list and not in said reference picture list are marked as unused for reference for any other picture decoded after the current picture, and
use said indication and said instruction in handling reference pictures in decoding of video data.

10. An apparatus according to claim 9, wherein said instruction is indicative of a reference picture list structure that comprises an ordered list of reference pictures.

11. An apparatus according to claim 9, further comprising computer program code configured to, with the processor, cause the apparatus to perform at least the following:
decode from a bitstream an identification of an algorithm to be used for adding and removing pictures from said idle reference picture list in case provision or transmission of said idle reference picture has been at least partially omitted.

12. An apparatus according to claim 9, wherein the apparatus is a transcoder element in a network.

13. A computer program product comprising computer program code embodied on a non-transitory computer-readable memory, said computer program code comprising:
a computer program code section for providing an indication in a syntax element, said indication indicative of whether a picture is to be used as a reference picture in decoding or not,
a computer program code section for providing an instruction in said syntax element, said instruction indicative of a reference picture list structure, said reference picture list comprising pictures to be used in decoding a current picture, and
a computer program code section for providing an idle reference picture list instruction in a syntax element, said idle reference picture list instruction indicative of an idle reference picture list structure, a pictures in said idle reference picture list are not used as reference pictures in decoding of the current picture, but are to be used as reference pictures in decoding of another picture than the current picture, wherein the pictures in said idle reference picture list are different than the pictures in the reference picture list and are not included in the reference picture list, and wherein pictures that are not in said idle reference picture list and not in said reference picture list are marked as unused for reference for any other picture decoded after the current picture.

14. A computer program product comprising computer program code embodied on a non-transitory computer-readable memory, said computer program code comprising:
a computer program code section for decoding from a bitstream an indication from a syntax element, said indication indicative of whether a picture is to be used as a reference picture in decoding or not,
a computer program code section for decoding an instruction from said syntax element, said instruction indicative of a reference picture list structure, said reference picture list comprising pictures to be used in decoding a current picture,
a computer program code section for decoding an idle reference picture list instruction in a syntax element, said idle reference picture list instruction indicative of an idle reference picture list structure, wherein pictures in said idle reference picture list are not used as reference pictures in decoding of the current picture, but are to be used as reference pictures in decoding of another picture than the current picture, wherein the pictures in said idle reference picture list are different than the pictures in the reference picture list and are not included in the reference picture list, and wherein pictures that are not in said idle reference picture list and not in said reference picture list are marked as unused for reference for any other picture decoded after the current picture, and a computer program code section for using said indication and said instruction in handling reference pictures in decoding of video data.

15. A method according to claim 1, wherein said instruction comprises picture order count identifiers of pictures in the reference picture list structure.

16. A method according to claim 4, wherein said instruction comprises picture order count identifiers of pictures in the reference picture list structure.

17. An apparatus according to claim 6, wherein said instruction comprises picture order count identifiers of pictures in the reference picture list structure.

18. An apparatus according to claim 9, wherein said instruction comprises picture order count identifiers of pictures in the reference picture list structure.

19. A computer program product according to claim 13, wherein said instruction comprises picture order count identifiers of pictures in the reference picture list structure.

20. A computer program product according to claim 14, wherein said instruction comprises picture order count identifiers of pictures in the reference picture list structure.

\* \* \* \* \*